United States Patent
Ogawa et al.

(10) Patent No.: US 9,847,542 B2
(45) Date of Patent: *Dec. 19, 2017

(54) FUEL CELL MODULE

(71) Applicant: HONDA MOTOR CO., LTD., Tokyo (JP)

(72) Inventors: Tetsuya Ogawa, Wako (JP); Yuki Yoshimine, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 376 days.

This patent is subject to a terminal disclaimer.

(21) Appl. No.: 14/406,572

(22) PCT Filed: Apr. 26, 2013

(86) PCT No.: PCT/JP2013/062871
§ 371 (c)(1),
(2) Date: Dec. 9, 2014

(87) PCT Pub. No.: WO2013/187153
PCT Pub. Date: Dec. 19, 2013

(65) Prior Publication Data
US 2015/0132674 A1    May 14, 2015

(30) Foreign Application Priority Data

Jun. 12, 2012    (JP) .................................. 2012-132893

(51) Int. Cl.
*H01M 8/06* (2016.01)
*H01M 8/04* (2016.01)
(Continued)

(52) U.S. Cl.
CPC ........... *H01M 8/0618* (2013.01); *C01B 3/384* (2013.01); *H01M 8/04022* (2013.01);
(Continued)

(58) Field of Classification Search
None
See application file for complete search history.

(56) References Cited

U.S. PATENT DOCUMENTS 8,125,078 B2    2/2012    Yoshida et al.
2001/0009732 A1    7/2001    Schuler
(Continued)

FOREIGN PATENT DOCUMENTS

EP    2143685 A1 *    1/2010    ............. C01B 3/384
JP    2001-236980    8/2001
(Continued)

OTHER PUBLICATIONS

This application is co-pending with U.S. Appl. No. 14/406,575, which was filed in the United States Patent and Trademark Office Dec. 9, 2014.
Japanese Office Action with partial English translation, dated Aug. 11, 2015, 4 pages.
(Continued)

*Primary Examiner* — Barbara Gilliam
*Assistant Examiner* — Zhongqing Wei
(74) *Attorney, Agent, or Firm* — Rankin, Hill & Clark LLP

(57) ABSTRACT

A fuel cell module includes a first area where an exhaust gas combustor and a start-up combustor are provided, an annular second area around the first area where a heat exchanger is provided, an annular third area around the second area where a reformer is provided, an annular fourth area around the third area where an evaporator is provided. The heat exchanger includes heat exchange pipes connected to an oxygen-containing gas supply chamber and an oxygen-containing gas discharge chamber. A first circumscribed non-uniform flow suppression plate is provided along a minimum circumscribed circle which contacts outer surfaces of the heat exchange pipes.

9 Claims, 18 Drawing Sheets

(51) Int. Cl.
  *H01M 8/24* (2016.01)
  *H01M 8/0612* (2016.01)
  *C01B 3/38* (2006.01)
  *H01M 8/04014* (2016.01)
  *H01M 8/04223* (2016.01)
  *H01M 8/2485* (2016.01)
  *H01M 8/124* (2016.01)

(52) U.S. Cl.
  CPC ..... *H01M 8/04268* (2013.01); *H01M 8/0631* (2013.01); *H01M 8/2485* (2013.01); *C01B 2203/0233* (2013.01); *C01B 2203/066* (2013.01); *C01B 2203/0811* (2013.01); *C01B 2203/1288* (2013.01); *H01M 2008/1293* (2013.01); *H01M 2300/0074* (2013.01); *Y02P 20/124* (2015.11)

(56) References Cited

U.S. PATENT DOCUMENTS

| | | | |
|---|---|---|---|
| 2009/0212259 A1 | 8/2009 | Noguchi et al. | |
| 2010/0021784 A1* | 1/2010 | Fourmigue | H01M 8/04022 429/423 |

FOREIGN PATENT DOCUMENTS

| | | |
|---|---|---|
| JP | 2004-288434 | 10/2004 |
| JP | 2010-504607 | 2/2010 |
| WO | 2008/084870 | 7/2008 |

OTHER PUBLICATIONS

Office Action dated Feb. 27, 2017 from U.S. Appl. No. 14/406,575, 29 pages.

\* cited by examiner

US 9,847,542 B2

FUEL CELL MODULE

TECHNICAL FIELD

The present invention relates to a fuel cell module including a fuel cell stack formed by stacking a plurality of fuel cells for generating electricity by electrochemical reactions of a fuel gas and an oxygen-containing gas.

BACKGROUND ART

Typically, a solid oxide fuel cell (SOFC) employs a solid electrolyte of ion-conductive oxide such as stabilized zirconia. The electrolyte is interposed between an anode and a cathode to form an electrolyte electrode assembly, for example, a membrane electrode assembly (hereinafter also referred to as MEA). The electrolyte electrode assembly is interposed between separators (bipolar plates). In use, generally, predetermined numbers of the electrolyte electrode assemblies and the separators are stacked together to form a fuel cell stack.

As a system including this fuel cell stack, for example, a fuel cell battery disclosed in Japanese Laid-Open Patent Publication No. 2001-236980 (hereinafter referred to as conventional technique 1) is known. As shown in FIG. 16, the fuel cell battery includes a fuel cell stack 1$a$, and a heat insulating sleeve 2$a$ is provided at one end of the fuel cell stack 1$a$. A reaction device 4$a$ is provided in the heat insulating sleeve 2$a$. The reaction device 4$a$ includes a heat exchanger 3$a$.

In the reaction device 4$a$, as a treatment of liquid fuel, partial oxidation reforming which does not use water is performed. After the liquid fuel is evaporated by an exhaust gas, the liquid fuel passes through a feeding point 5$a$ which is part of the heat exchanger 3$a$. The fuel contacts an oxygen carrier gas heated by the exhaust gas to induce partial oxidation reforming, and thereafter the fuel is supplied to the fuel cell stack 1$a$.

Further, as shown in FIG. 17, a solid oxide fuel cell disclosed in Japanese Laid-Open Patent Publication No. 2010-504607 (PCT) (hereinafter referred to as conventional technique 2) has a heat exchanger 2$b$ including a cell core 1$b$. The heat exchanger 2$b$ heats the cathode air utilizing waste heat.

Further, as shown in FIG. 18, a fuel cell system disclosed in Japanese Laid-Open Patent Publication No. 2004-288434 (hereinafter referred to as conventional technique 3) includes a first area 1$c$ having a columnar shape extending vertically, and an annular second area 2$c$ around the first area 1$c$, an annular third area 3$c$ around the second area 2$c$, and an annular fourth area 4$c$ around the third area 3$c$.

A burner 5$c$ is provided in the first area 1$c$, and a reforming pipe 6$c$ is provided in the second area 2$c$. A water evaporator 7$c$ is provided in the third area 3$c$, and a CO shift converter 8$c$ is provided in the fourth area 4$c$.

SUMMARY OF INVENTION

In the conventional technique 1, since the heat exchanger 3$a$ only heats the outer wall by the exhaust gas, the desired quantity of heat cannot be passed from the exhaust gas. Moreover, the flow of the exhaust gas tends to be non-uniform.

Further, in the conventional technique 2, since the heat exchanger 2$b$ only heats the outer wall by the exhaust gas, the desired quantity of heat cannot be passed from the exhaust gas. Moreover, the flow of the exhaust gas tends to be non-uniform.

Further, in the conventional technique 3, the combustion gas flows along the partition wall. Therefore, the effective quantity of heat cannot be secured.

The present invention has been made to solve the problems of this type, and an object of the present invention is to provide a fuel cell module having simple and compact structure in which it is possible to reliably suppress non-uniform flow of a combustion gas, and improve the heat exchange efficiency.

The present invention relates to a fuel cell module including a fuel cell stack formed by stacking a plurality of fuel cells for generating electricity by electrochemical reactions of a fuel gas and an oxygen-containing gas, a reformer for reforming a mixed gas of water vapor and a raw fuel chiefly containing hydrocarbon to produce the fuel gas supplied to the fuel cell stack, an evaporator for evaporating water, and supplying the water vapor to the reformer, a heat exchanger for raising a temperature of the oxygen-containing gas by heat exchange with a combustion gas, and supplying the oxygen-containing gas to the fuel cell stack, an exhaust gas combustor for combusting the fuel gas discharged from the fuel cell stack as a fuel exhaust gas and the oxygen-containing gas discharged from the fuel cell stack as an oxygen-containing exhaust gas to produce the combustion gas, and a start-up combustor for combusting the raw fuel and the oxygen-containing gas to produce the combustion gas.

The fuel cell module includes a first area where the exhaust gas combustor and the start-up combustor are provided, an annular second area around the first area where one of the reformer and the heat exchanger is provided, an annular third area around the second area where another of the reformer and the heat exchanger is provided, and an annular fourth area around the third area where the evaporator is provided.

The heat exchanger includes an annular oxygen-containing gas supply chamber to which the oxygen-containing gas is supplied, an annular oxygen-containing gas discharge chamber to which the heated oxygen-containing gas is discharged, a plurality of heat exchange pipes connected to the oxygen-containing gas supply chamber at one end, and connected to the oxygen-containing gas discharge chamber at another end, and a combustion gas channel for supplying the combustion gas to a space between the heat exchange pipes. A circumscribed non-uniform flow suppression plate is provided along a minimum circumscribed circle which contacts outer surfaces of the heat exchange pipes.

In the present invention, the exhaust gas combustor and the start-up combustor are provided in the first area at the center. The annular second area is provided around the first area, and the annular third area is provided around the second area, and the annular fourth area is provided around the third area, successively. In the structure, high temperature equipment with a large heat demand can be provided inside, and low temperature equipment with a small heat demand can be provided outside. Thus, improvement in the heat efficiency is achieved, and thermally self-sustaining operation is facilitated. Further, simple and compact structure is achieved.

Further, in the heat exchanger, the annular oxygen-containing gas supply chamber, the annular oxygen-containing gas discharge chamber, and the plurality of heat exchange pipes are provided as basic structure. Thus, simple structure is achieved easily. Accordingly, the production cost of the heat exchanger is reduced effectively. Further, by changing the volumes of the oxygen-containing gas supply chamber and the oxygen-containing gas discharge chamber, the length, the diameter, and the number of the pipes, the desired operation can be achieved in various operating conditions, and a wider variety of designs become available.

Further, the circumscribed non-uniform flow suppression plate is provided along the minimum circumscribed circle which contacts the outer surfaces of the plurality of heat exchange pipes. In the structure, by operation of the circumscribed non-uniform flow suppression plate, the combustion gas can flow along the outer surfaces of the heat exchange pipes suitably. Thus, non-uniform flow and blow-through of the combustion gas are suppressed suitably, and the channel of the combustion gas is sufficiently long. Accordingly, the quantity of the heat passed from the combustion gas to the oxygen-containing gas is increased, and improvement in the heat exchange efficiency is achieved suitably.

DESCRIPTION OF EMBODIMENTS

Figure 1:
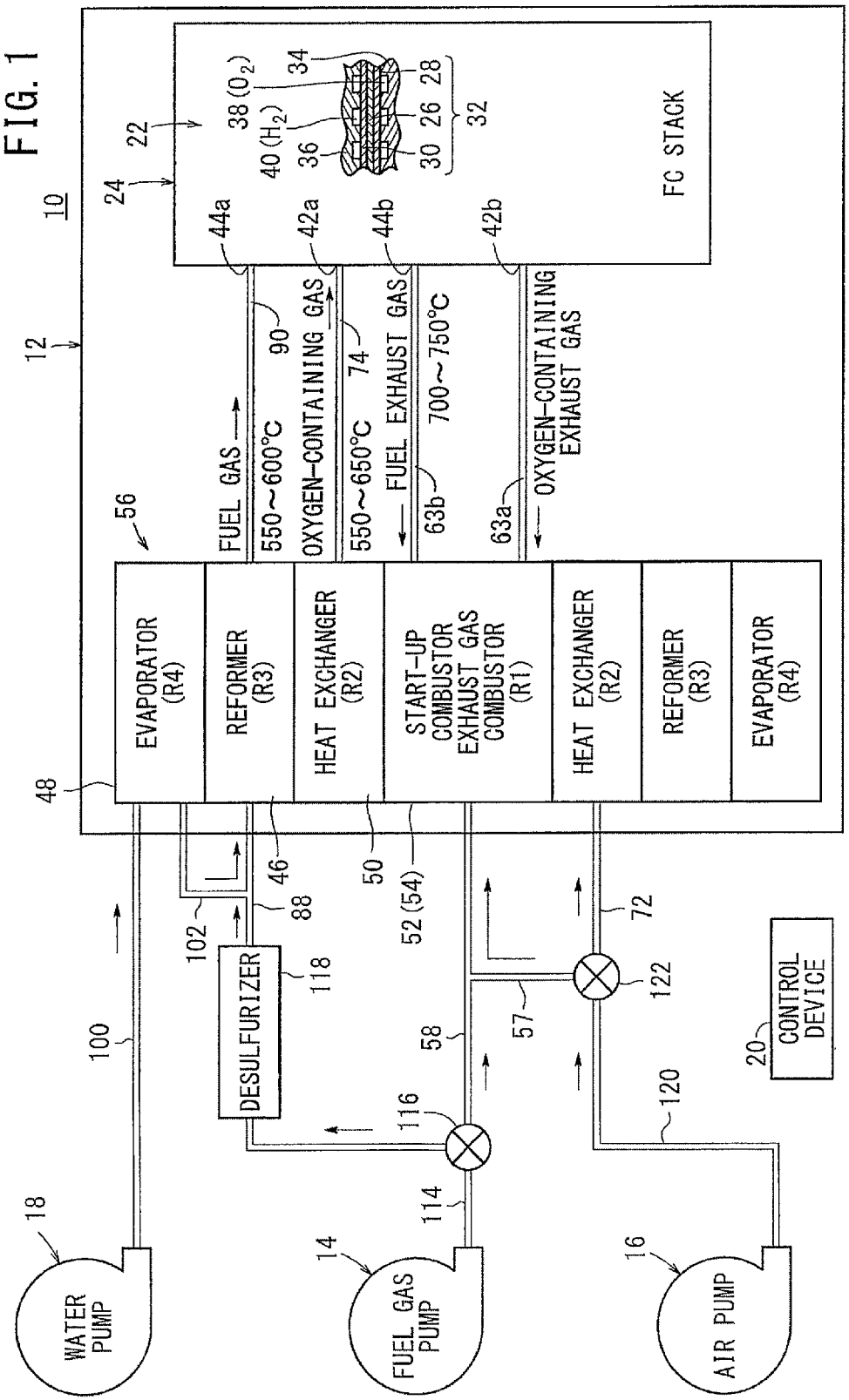
FIG. 1 is a diagram schematically showing structure of a fuel cell system including a fuel cell module according to a first embodiment of the present invention.

As shown in FIG. 1, a fuel cell system 10 includes a fuel cell module 12 according to a first embodiment of the present invention, and the fuel cell system 10 is used in various applications, including stationary and mobile applications. For example, the fuel cell system 10 is mounted on a vehicle.

The fuel cell system 10 includes the fuel cell module (SOFC module) 12 for generating electrical energy in power generation by electrochemical reactions of a fuel gas (a gas produced by mixing a hydrogen gas, methane, and carbon monoxide) and an oxygen-containing gas (air), a raw fuel supply apparatus (including a fuel gas pump) 14 for supplying a raw fuel (e.g., city gas) to the fuel cell module 12, an oxygen-containing gas supply apparatus (including an air pump) 16 for supplying the oxygen-containing gas to the fuel cell module 12, a water supply apparatus (including a water pump) 18 for supplying water to the fuel cell module 12, and a control device 20 for controlling the amount of electrical energy (power) generated in the fuel cell module 12.

The fuel cell module 12 includes a fuel cell stack 24 formed by stacking a plurality of solid oxide fuel cells 22 in a vertical direction (or horizontal direction). The fuel cell 22 includes an electrolyte electrode assembly (MEA) 32. The electrolyte electrode assembly 32 includes a cathode 28, an anode 30, and an electrolyte 26 interposed between the cathode 28 and the anode 30. For example, the electrolyte 26 is made of ion-conductive oxide such as stabilized zirconia.

A cathode side separator 34 and an anode side separator 36 are provided on both sides of the electrolyte electrode assembly 32. An oxygen-containing gas flow field 38 for supplying the oxygen-containing gas to the cathode 28 is formed in the cathode side separator 34, and a fuel gas flow field 40 for supplying the fuel gas to the anode 30 is formed in the anode side separator 36. As the fuel cell 22, various types of conventional SOFCs can be adopted.

The operating temperature of the fuel cell 22 is high, at several hundred ° C. Methane in the fuel gas is reformed at the anode 30 to obtain hydrogen and CO, and the hydrogen and CO are supplied to a portion of the electrolyte 26 adjacent to the anode 30.

An oxygen-containing gas supply passage 42$a$, an oxygen-containing gas discharge passage 42$b$, a fuel gas supply passage 44$a$, and a fuel gas discharge passage 44$b$ extend through the fuel cell stack 24. The oxygen-containing gas supply passage 42$a$ is connected to an inlet of each oxygen-containing gas flow field 38, the oxygen-containing gas discharge passage 42$b$ is connected to an outlet of each oxygen-containing gas flow field 38, the fuel gas supply passage 44$a$ is connected to an inlet of each fuel gas flow field 40, and the fuel gas discharge passage 44$b$ is connected to an outlet of each fuel gas flow field 40.

The fuel cell module 12 includes a reformer 46 for reforming a mixed gas of water vapor and a raw fuel chiefly containing hydrocarbon (e.g., city gas) to produce a fuel gas supplied to the fuel cell stack 24, an evaporator 48 for evaporating water and supplying the water vapor to the reformer 46, a heat exchanger 50 for raising the temperature of the oxygen-containing gas by heat exchange with a combustion gas, and supplying the oxygen-containing gas to the fuel cell stack 24, an exhaust gas combustor 52 for combusting the fuel gas discharged from the fuel cell stack 24 as a fuel exhaust gas and the oxygen-containing gas discharged from the fuel cell stack 24 as an oxygen-containing exhaust gas to produce the combustion gas, and a start-up combustor 54 for combusting the raw fuel and the oxygen-containing gas to produce the combustion gas.

Basically, the fuel cell module 12 is made up of the fuel cell stack 24 and FC (fuel cell) peripheral equipment 56. The FC peripheral equipment (BOP, Balance of Plant) 56 includes the reformer 46, the evaporator 48, the heat exchanger 50, the exhaust gas combustor 52, and the start-up combustor 54.

Figure 2:
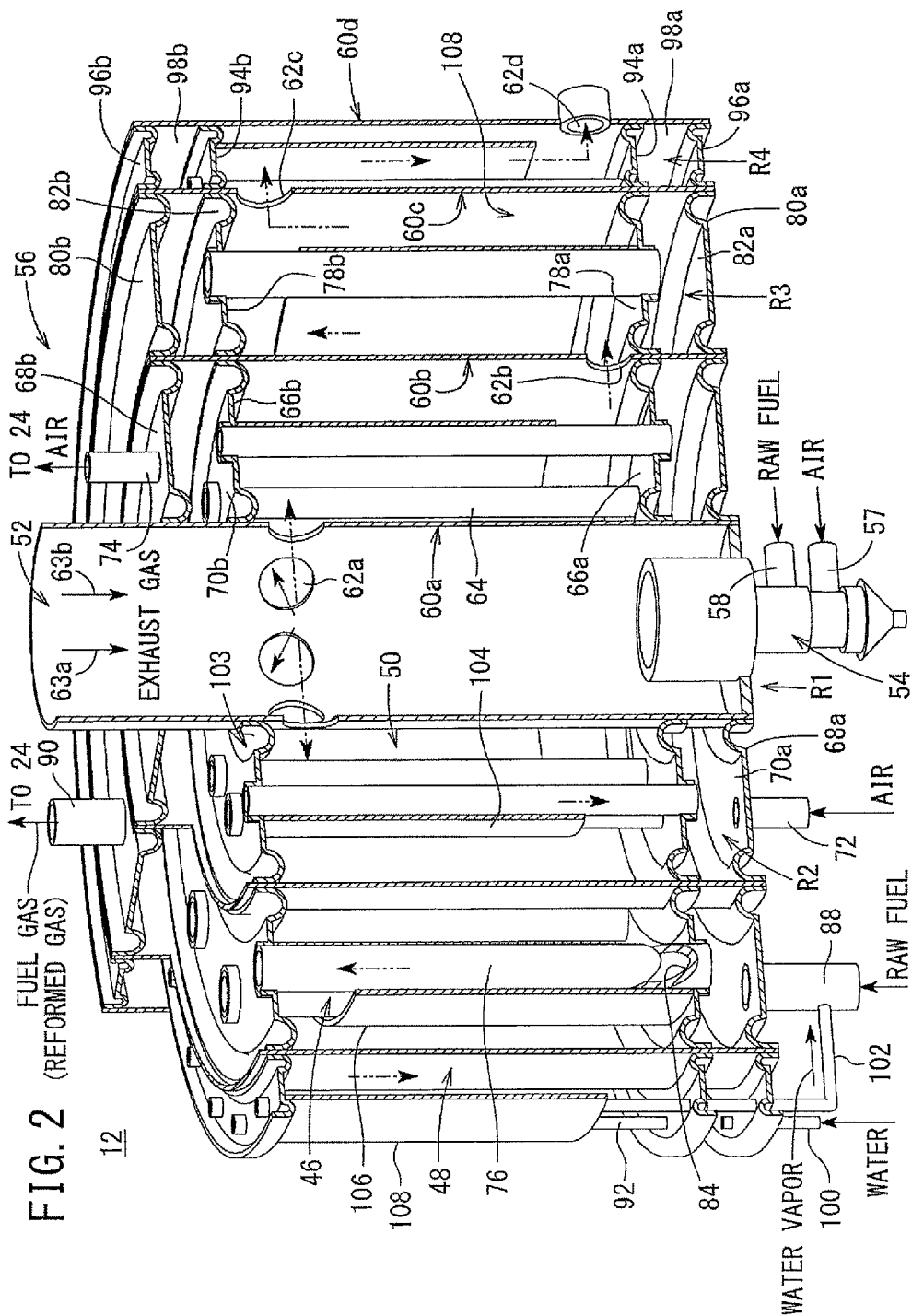
FIG. 2 is a perspective view with partial omission showing FC peripheral equipment of the fuel cell module.

As shown in FIG. 2, the FC peripheral equipment 56 includes a first area R1 comprising, e.g., a circular opening where the exhaust gas combustor 52 and the start-up combustor 54 are provided, an annular second area R2 formed around the first area R1 where the heat exchanger 50 is provided, an annular third area R3 formed around the second area R2 where the reformer 46 is provided, and an annular fourth area R4 formed around the third area R3 where the evaporator 48 is provided.

Figure 3:
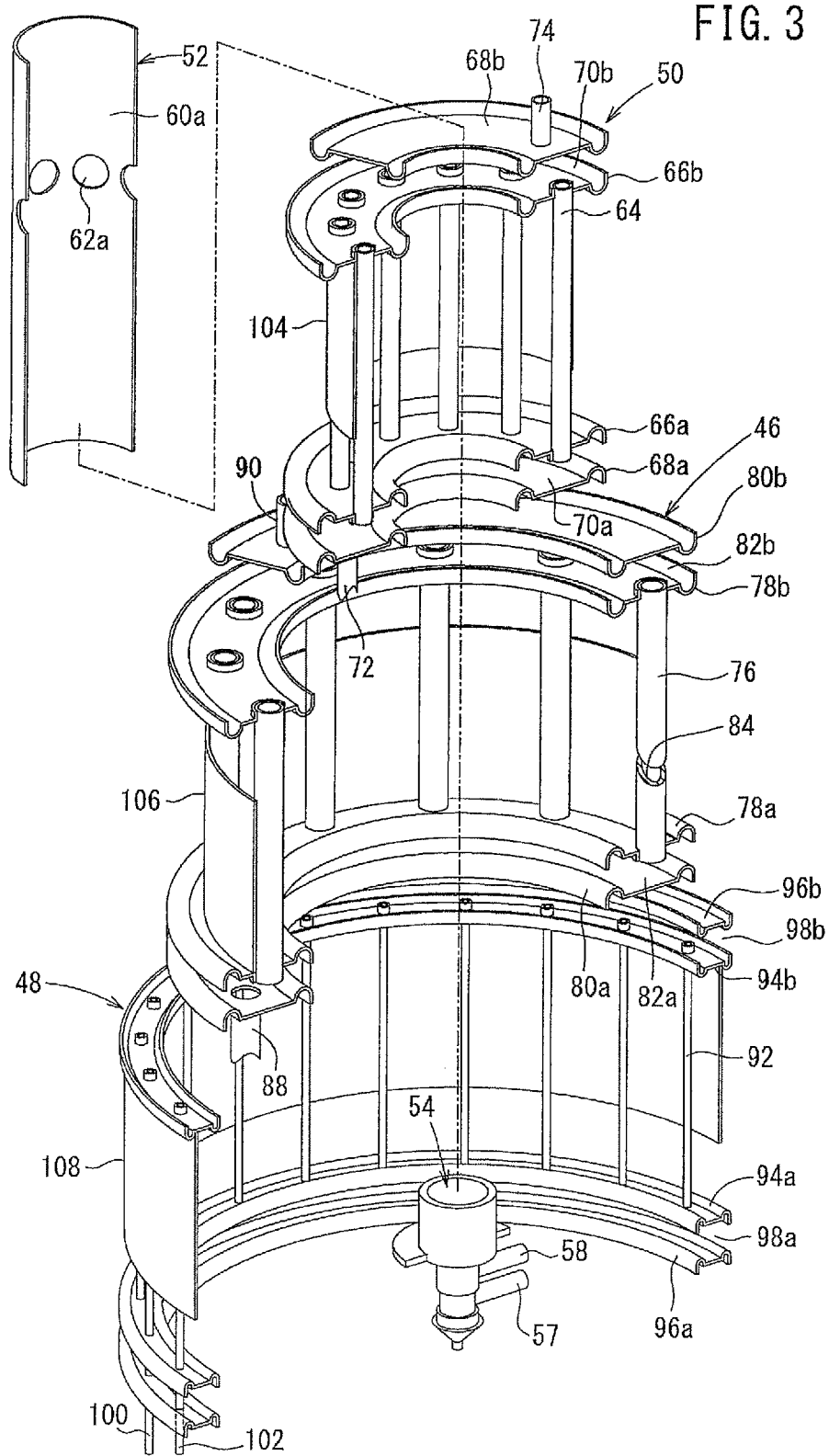
FIG. 3 is an exploded perspective view showing main components of the FC peripheral equipment.

As shown in FIGS. 2 and 3, the start-up combustor 54 includes an air supply pipe 57 and a raw fuel supply pipe 58. The start-up combustor 54 has an ejector function, and generates negative pressure in the raw fuel supply pipe 58 by the flow of the air supplied from the air supply pipe 57 for sucking the raw fuel.

Figure 4:
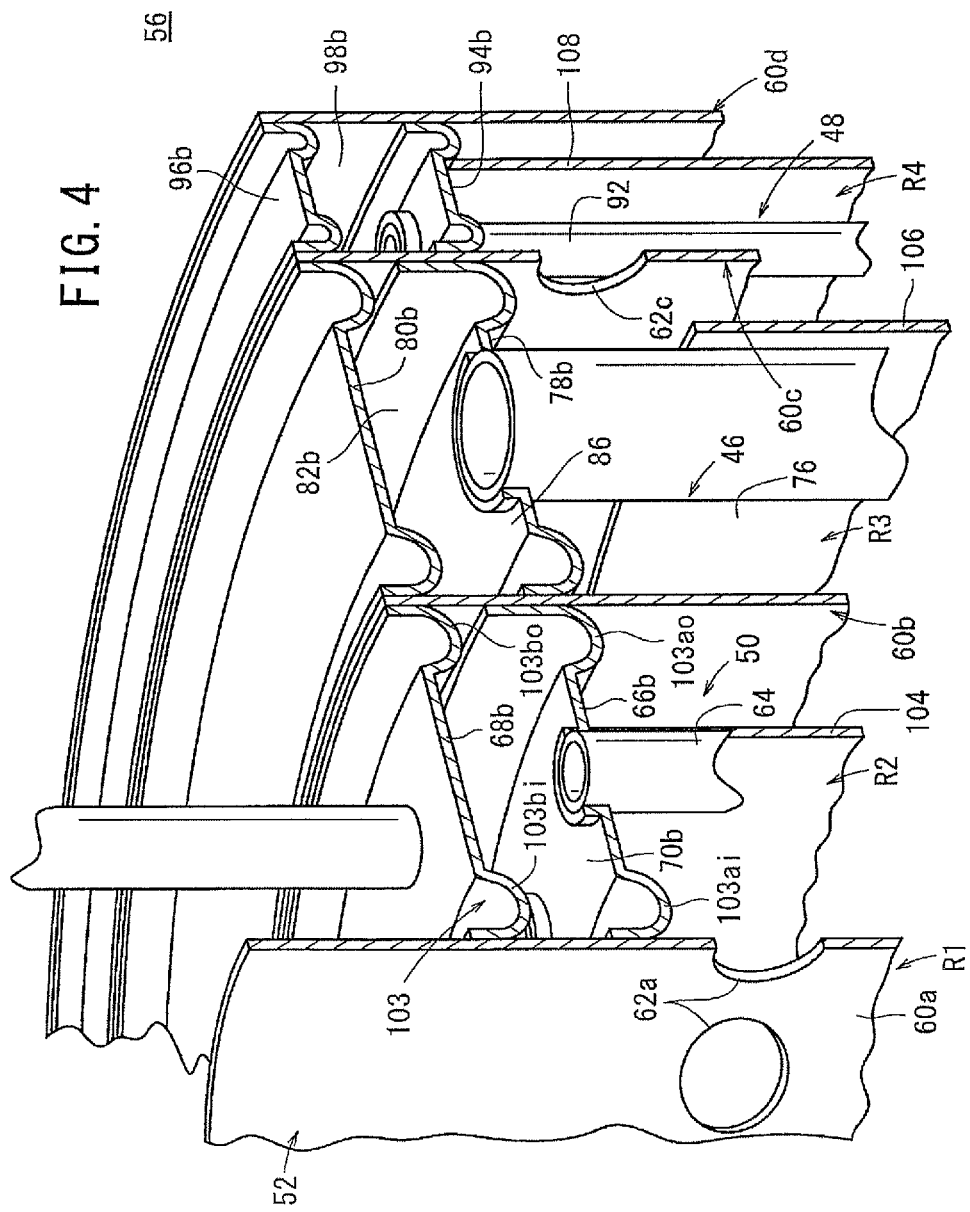
FIG. 4 is an enlarged perspective view showing main components of the FC peripheral equipment.

As shown in FIGS. 2 and 4, the FC peripheral equipment 56 includes a first partition plate 60a provided between the first area R1 and the second area R2, a second partition plate 60b provided between the second area R2 and the third area R3, and a third partition plate 60c provided between the third area R3 and the fourth area R4. A fourth partition plate 60d is provided around the fourth area R4. For example, the first partition plate 60a to the fourth partition plate 60d are made of stainless steel plates.

As shown in FIGS. 2 and 3, the exhaust gas combustor 52 is provided inside the first partition plate 60a containing the start-up combustor 54. The first partition plate 60a has a cylindrical shape, and a plurality of first combustion gas holes 62a are formed along the outer circumferential portion of the first partition plate 60a, adjacent to an end of the first partition plate 60a closer to the fuel cell stack 24.

A plurality of second combustion gas holes 62b are formed adjacent to an end of the second partition plate 60b opposite to the fuel cell stack 24. A plurality of third combustion gas holes 62c are formed adjacent to an end of the third partition plate 60c closer to the fuel cell stack 24. A plurality of fourth combustion gas holes 62d are formed adjacent to an end of the fourth partition plate 60d opposite to the fuel cell stack 24. The combustion gas is discharged to the outside through the fourth combustion gas holes 62d.

One end of an oxygen-containing exhaust gas channel 63a and one end of a fuel exhaust gas channel 63b are provided at the first partition plate 60a. The combustion gas is produced inside the first partition plate 60a by combustion reaction of the fuel gas (specifically, fuel exhaust gas) and the oxygen-containing gas (specifically, oxygen-containing exhaust gas).

As shown in FIG. 1, the other end of the oxygen-containing exhaust gas channel 63a is connected to the oxygen-containing gas discharge passage 42b of the fuel cell stack 24, and the other end of the fuel exhaust gas channel 63b is connected to the fuel gas discharge passage 44b of the fuel cell stack 24.

As shown in FIGS. 2 and 3, the heat exchanger 50 includes a plurality of heat exchange pipes (heat transmission pipes) 64 provided around the first partition plate 60a. The heat exchange pipes 64 are fixed to a first inner ring 66a of an oxygen-containing gas supply chamber 70a described later at one end (an end opposite to the fuel cell stack 24: hereinafter, in the same manner, the end opposite to the fuel cell stack 24 is referred to as one end), and the heat exchange pipes 64 are fixed to a first inner ring 66b of an oxygen-containing gas discharge chamber 70b described later at the other end (an end closer to the fuel cell stack 24: hereinafter, in the same manner, the end closer to the fuel cell stack 24 is referred to as the other end).

A first outer ring 68a is provided outside the first inner ring 66a, and a first outer ring 68b is provided outside the first inner ring 66b. The first inner rings 66a, 66b and the first outer rings 68a, 68b are fixed to the outer circumferential surface of the first partition plate 60a and the inner circumference surface of the second partition plate 60b.

The annular oxygen-containing gas supply chamber 70a is formed between the first inner ring 66a and the first outer ring 68a, and the oxygen-containing gas is supplied to the oxygen-containing gas supply chamber 70a. The annular oxygen-containing gas discharge chamber 70b is formed between the first inner ring 66b and the first outer ring 68b, and the heated oxygen-containing gas is discharged to the oxygen-containing gas discharge chamber 70b (see FIGS. 2 to 4). Both ends of each of the heat exchange pipes 64 are opened to the oxygen-containing gas supply chamber 70a and the oxygen-containing gas discharge chamber 70b.

As shown in FIGS. 2 and 3, an oxygen-containing gas supply pipe 72 is provided in the oxygen-containing gas supply chamber 70a. One end of an oxygen-containing gas channel 74 is provided in the oxygen-containing gas discharge chamber 70b, and the other end of the oxygen-containing gas channel 74 is connected to the oxygen-containing gas supply passage 42a of the fuel cell stack 24 (see FIG. 1).

The reformer 46 is a preliminary reformer for reforming higher hydrocarbon ($C_{2+}$) such as ethane ($C_2H_6$), propane ($C_3H_8$), and butane ($C_4H_{10}$) in the city gas (raw fuel) to produce the fuel gas chiefly containing methane ($CH_4$), hydrogen, and CO by steam reforming. The operating temperature of the reformer 46 is several hundred ° C.

As shown in FIGS. 2 and 3, the reformer 46 includes a plurality of reforming pipes (heat transmission pipes) 76 provided around the heat exchanger 50. The reforming pipes 76 are fixed to a second inner ring 78a at one end, and fixed to a second inner ring 78b at the other end.

A second outer ring 80a is provided outside the second inner ring 78a, and a second outer ring 80b is provided outside the second inner ring 78b. The second inner rings 78a, 78b and the second outer rings 80a, 80b are fixed to the outer circumferential surface of the second partition plate 60b and the inner circumferential surface of the third partition plate 60c.

An annular mixed gas supply chamber 82a is formed between the second inner ring 78a and the second outer ring 80a, and a mixed gas of raw fuel and water vapor is supplied to the mixed gas supply chamber 82a. An annular reformed gas discharge chamber 82b is formed between the second inner ring 78b and the second outer ring 80b, and the produced fuel gas (reformed gas) is discharged to the reformed gas discharge chamber 82b. Both ends of each of the reforming pipes 76 are opened to the mixed gas supply chamber 82a and the reformed gas discharge chamber 82b. Reforming catalyst 84 is supported on the inner circumferential surface of each of the reforming pipes 76.

As shown in FIGS. 2 and 3, a raw fuel supply channel 88 is connected to the mixed gas supply chamber 82a, and an evaporation return pipe 102 described later is connected to some part of the raw fuel supply channel 88. One end of a fuel gas channel 90 is connected to the reformed gas discharge chamber 82b, and the other end of the fuel gas channel 90 is connected to the fuel gas supply passage 44a of the fuel cell stack 24 (see FIG. 1).

The evaporator 48 includes a plurality of evaporation pipes (heat transmission pipes) 92 provided around the reformer 46. The evaporation pipes 92 are fixed to a third inner ring 94a at one end, and fixed to a third inner ring 94b at the other end.

A third outer ring 96a is provided outside the third inner ring 94a, and a third outer ring 96b is provided outside the third inner ring 94b. The third inner rings 94a, 94b and the third outer rings 96a, 96b are fixed to the outer circumferential surface of the third partition plate 60c and the inner circumferential surface of the fourth partition plate 60d.

An annular water supply chamber 98a is formed between the third inner ring 94a and the third outer ring 96a, and water is supplied to the water supply chamber 98a. An annular water vapor discharge chamber 98b is formed between the third inner ring 94b and the third outer ring 96b, and water vapor is discharged to the water vapor discharge chamber 98b. Both ends of each of the evaporation pipes 92 are opened to the water supply chamber 98a and the water vapor discharge chamber 98b.

A water channel 100 is connected to the water supply chamber 98a. One end of the evaporation return pipe 102 having at least one evaporation pipe 92 is provided in the water vapor discharge chamber 98b, and the other end of the evaporation return pipe 102 is connected to some part of the raw fuel supply channel 88 (see FIG. 1). The raw fuel supply channel 88 has an ejector function, and generates negative pressure by the flow of the raw fuel for sucking the water vapor.

A stress absorbing section 103 for absorbing the heat stress is provided in at least one of the first area R1, the second area R2, the third area R3, and the fourth area R4 (in particular, in an area which tends to be exposed to high heat).

The stress absorbing section 103 is provided in at least in one of the oxygen-containing gas discharge chamber 70b, the reformed gas discharge chamber 82b, and the water vapor discharge chamber 98b. In the first embodiment, the stress absorbing section 103 is provided in the inner rings 66b, 78b, 94b, and the outer rings 68b, 80b, 96b of all of the oxygen-containing gas discharge chamber 70b, the reformed gas discharge chamber 82b, and the water vapor discharge chamber 98b (see FIG. 4).

Further, the stress absorbing section 103 is provided in at least one of the oxygen-containing gas supply chamber 70a, the mixed gas supply chamber 82a, and the water supply chamber 98a. In the first embodiment, the stress absorbing section 103 is provided in the inner rings 66a, 78a, 94a, and the outer rings 68a, 80a, 96a of all of the oxygen-containing gas supply chamber 70a, the mixed gas supply chamber 82a, and the water supply chamber 98a (see FIG. 2). For example, the inner rings 66a, 66b, 78a, 78b, 94a, 94b and the outer rings 68a, 68b, 80a, 80b, 96a, 96b are made of stainless steels.

In particular, as shown in FIG. 4, in the oxygen-containing gas discharge chamber 70b exposed to the exhaust gas at high temperature, an inner curved section 103ai and an outer curved section 103ao each having a semicircular shape in cross section are provided. In the oxygen-containing gas discharge chamber 70b, in the same manner, an inner curved section 103bi and an outer curved section 103bo each having a semicircular shape in cross section are provided.

Each of the inner curved sections 103ai, 103bi and the outer curved sections 103ao, 103bo functions as a spring having low rigidity for absorbing displacement to form the stress absorbing section 103. It should be noted that only the inner curved sections 103ai, 103bi or only the outer curved sections 103ao, 103bo may be provided. Further, the other inner rings 66a, 78a, 78b, 94a, 94b, and the outer rings 68a, 80a, 80b, 96a, 96b have the same structure as the inner ring 66b and the outer ring 68b, and the detailed description thereof is omitted.

In the first embodiment, as shown in FIGS. 2, 3, 5, and 6, a first circumscribed non-uniform flow suppression plate 104 is provided in the second area R2 (second combustion gas channel 126b) where the heat exchanger 50 is provided, between the first inner rings 66a, 66b.

Figure 5:
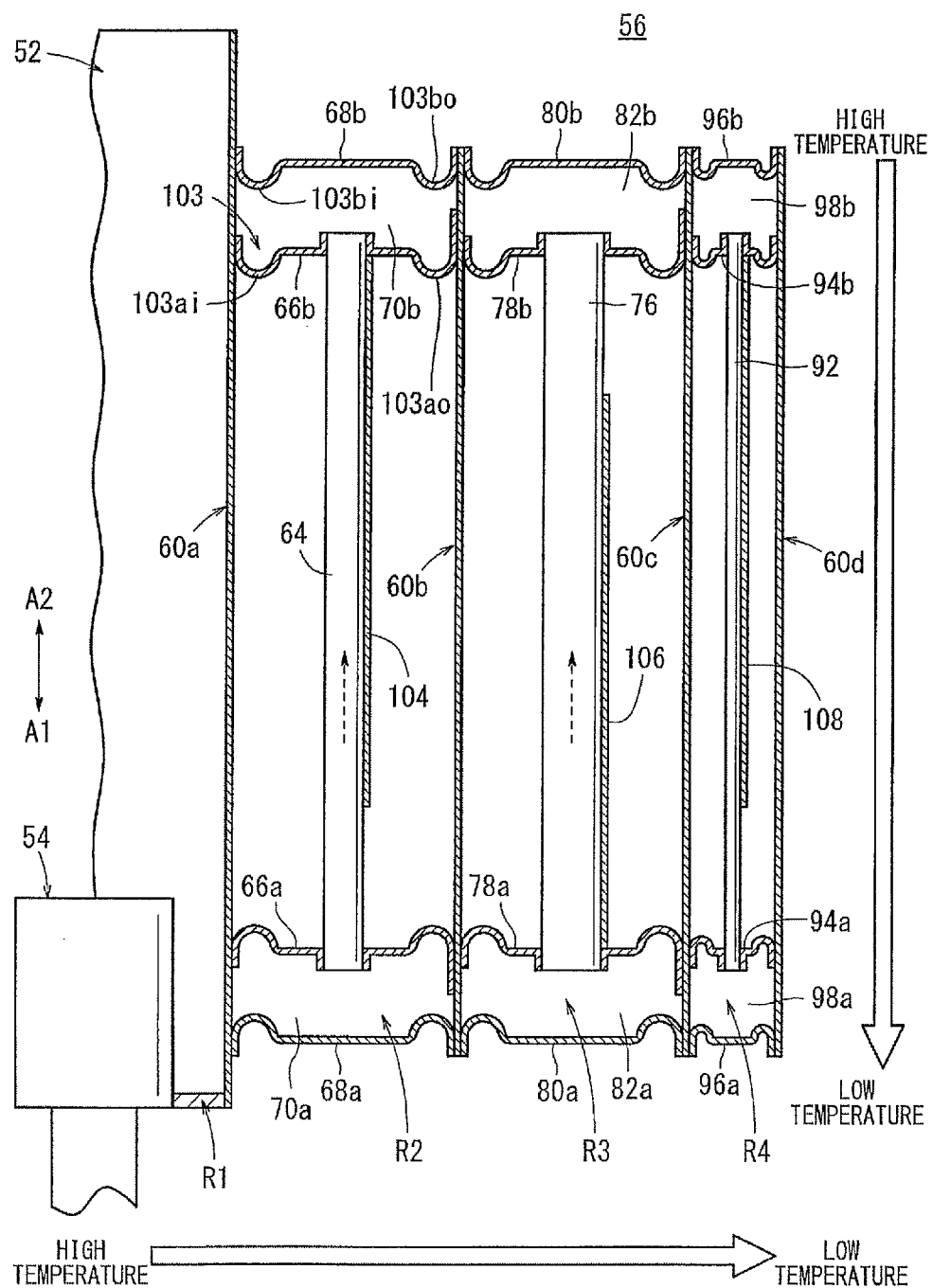
FIG. 5 is a view showing temperature distribution in the FC peripheral equipment.
Figure 6:
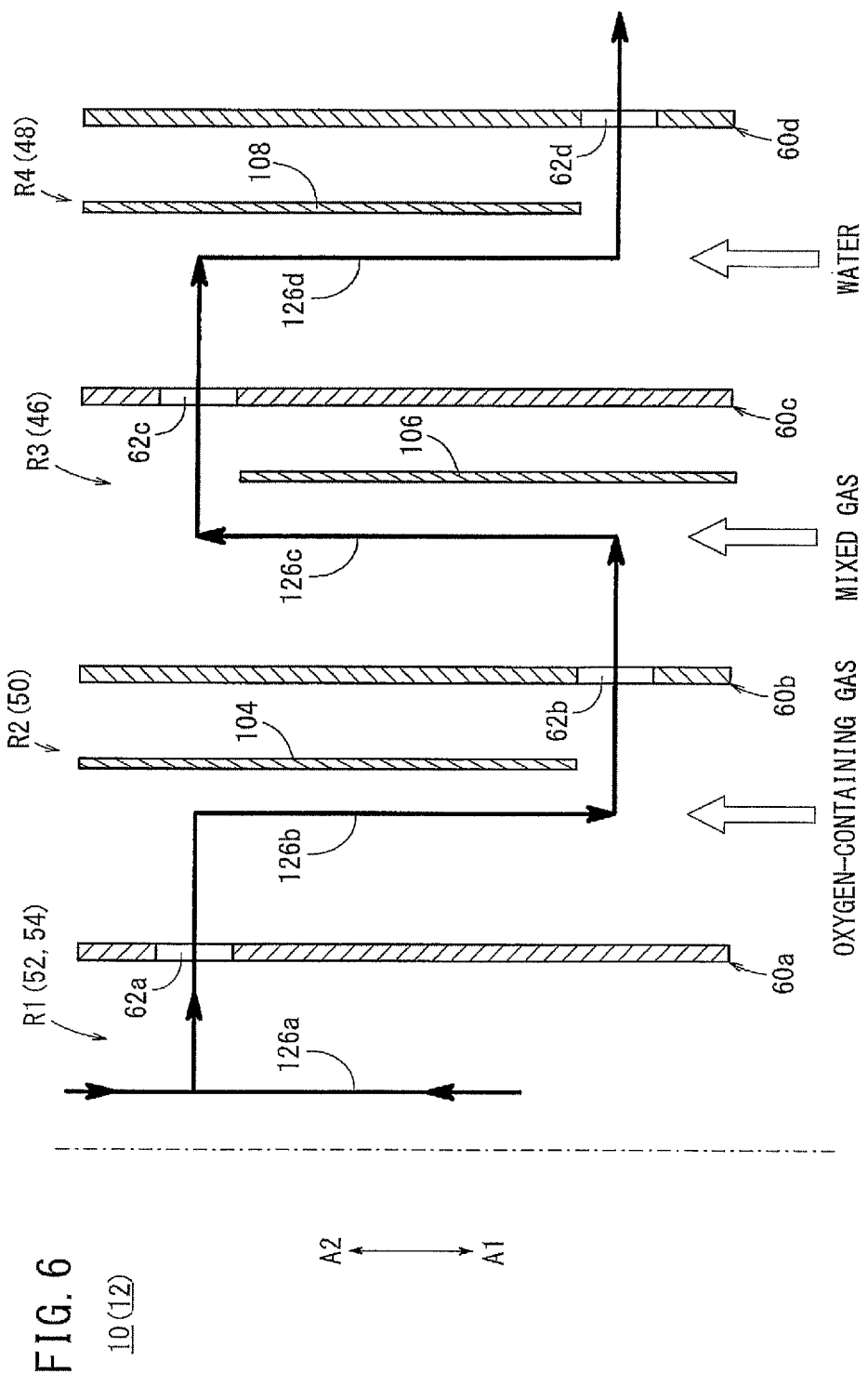
FIG. 6 is a view showing gas flows of a combustion gas in the FC peripheral equipment.

The first circumscribed non-uniform flow suppression plate 104 has a cylindrical shape provided along the minimum circumscribed circle which contacts the outer surfaces of the plurality of heat exchange pipes 64. For example, the first circumscribed non-uniform flow suppression plate 104 is fixed to the heat exchange pipes 64 by welding or the like. As shown in FIG. 6, the upper end of the first circumscribed non-uniform flow suppression plate 104 is positioned above the first combustion gas hole 62a, i.e., to face the first combustion gas hole 62a, and the lower end of the first circumscribed non-uniform flow suppression plate 104 is positioned above the second combustion gas hole 62b. As shown in FIG. 5, the upper end of the first circumscribed non-uniform flow suppression plate 104 contacts the first inner ring 66b.

The axial end of the first circumscribed non-uniform flow suppression plate 104 may be fixed to another member such that it can be provided as closely as possible to the heat exchange pipes 64. For example, the first circumscribed non-uniform flow suppression plate 104 is made of a thin metal plate which is preferably thinner than the first partition plate 60a to the fourth partition plate 60d. In effect, a heat insulating space is formed between the first circumscribed non-uniform flow suppression plate 104 and the first partition plate 60a. The other circumscribed non-uniform flow suppression plates described later have the same structure.

A second circumscribed non-uniform flow suppression plate 106 is provided in the third area R3 (third combustion gas channel 126c) where the reformer 46 is provided, between the second inner rings 78a, 78b. The second circumscribed non-uniform flow suppression plate 106 has a cylindrical shape provided along the minimum circumscribed circle which contacts the outer surfaces of the plurality of reforming pipes 76. For example, the second circumscribed non-uniform flow suppression plate 106 is fixed to the reforming pipes 76 by welding or the like.

As shown in FIG. 6, the upper end of the second circumscribed non-uniform flow suppression plate 106 is positioned below the third combustion gas hole 62c, and the lower end of the second circumscribed non-uniform flow suppression plate 106 is positioned below the second combustion gas hole 62b, i.e., to face the second combustion gas hole 62b. As shown in FIG. 5, the lower end of the second circumscribed non-uniform flow suppression plate 106 contacts the second inner ring 78a.

A third circumscribed non-uniform flow suppression plate 108 is provided in the fourth area R4 (fourth combustion gas channel 126d) where the evaporator 48 is provided, between the third inner rings 94a, 94b. The third circumscribed non-uniform flow suppression plate 108 has a cylindrical shape provided along the minimum circumscribed circle which contacts the outer surfaces of the plurality of evaporation pipes 92. For example, the third circumscribed non-uniform flow suppression plate 108 is fixed to the evaporation pipes 92 by welding or the like.

As shown in FIG. 6, the upper end of the third circumscribed non-uniform flow suppression plate 108 is positioned above the third combustion gas hole 62c, i.e., to face the third combustion gas hole 62c, and the lower end of the third circumscribed non-uniform flow suppression plate 108 is positioned above the fourth combustion gas hole 62d. As shown in FIG. 5, the upper end of the third circumscribed non-uniform flow suppression plate 108 contacts the third inner ring 94b.

As shown in FIG. 1, the raw fuel supply apparatus 14 includes a raw fuel channel 114. The raw fuel channel 114 is branched into the raw fuel supply channel 88 and the raw fuel supply pipe 58 through a raw fuel regulator valve 116. A desulfurizer 118 for removing sulfur compounds in the city gas (raw fuel) is provided in the raw fuel supply channel 88.

The oxygen-containing gas supply apparatus 16 includes an oxygen-containing gas channel 120. The oxygen-containing gas channel 120 is branched into the oxygen-containing gas supply pipe 72 and the air supply pipe 57 through an oxygen-containing gas regulator valve 122. The water supply apparatus 18 is connected to the evaporator 48 through the water channel 100.

As schematically shown in FIG. 6, a first combustion gas channel 126a as a passage of the combustion gas in the direction indicated by an arrow A2 is formed in the first area R1, the second combustion gas channel 126b as a passage of the combustion gas in a direction indicated by an arrow A1 is formed in the second area R2, the third combustion gas channel 126c as a passage of the combustion gas in the direction indicated by the arrow A2 is formed in the third area R3, and the fourth combustion gas channel 126d as a passage of the combustion gas in the direction indicated by the arrow A1 is formed in the fourth area R4.

Next, operation of the fuel cell system 10 will be described below.

At the time of starting operation of the fuel cell system 10, the air (oxygen-containing gas) and the raw fuel are supplied to the start-up combustor 54. In the oxygen-containing gas supply apparatus 16, specifically, by operation of the air pump, air is supplied to the oxygen-containing gas channel 120. By adjusting the opening angle of the oxygen-containing gas regulator valve 122, the air is supplied to the air supply pipe 57.

In the meanwhile, in the raw fuel supply apparatus 14, by operation of the fuel gas pump, for example, raw fuel such as the city gas (containing $CH_4$, $C_2H_6$, $C_3H_8$, $C_4H_{10}$) is supplied to the raw fuel channel 114. By regulating the opening angle of the raw fuel regulator valve 116, the raw fuel is supplied into the raw fuel supply pipe 58. The raw fuel is mixed with the air, and supplied into the start-up combustor 54 (see FIG. 2).

Thus, the mixed gas of the raw fuel and the air is supplied into the start-up combustor 54, and the mixed gas is ignited to start combustion. Therefore, in the exhaust gas combustor 52 directly connected to the start-up combustor 54, the combustion gas from the start-up combustor 54 flows into the first partition plate 60a.

As shown in FIG. 6, a plurality of first combustion gas holes 62a are formed at the end of the first partition plate 60a closer to the fuel cell stack 24. Thus, the combustion gas supplied into the first partition plate 60a passes through the first combustion gas holes 62a, and the combustion gas flows from the first area R1 to the second area R2.

In the second area R2, the combustion gas flows in the direction indicated by the arrow A1, and then, the combustion gas flows through the second combustion gas holes 62b formed in the second partition plate 60b into the third area R3. In the third area R3, the combustion gas flows in the direction indicated by the arrow A2, and then, the combustion gas flows through the third combustion gas holes 62c formed in the third partition plate 60c into the fourth area R4. In the fourth area R4, the combustion gas flows in the direction indicated by the arrow A1, and then, the combustion gas is discharged to the outside from the fourth combustion gas holes 62d formed in the fourth partition plate 60d.

The heat exchanger 50 is provided in the second area R2, the reformer 46 is provided in the third area R3, and the evaporator 48 is provided in the fourth area R4. Thus, the combustion gas discharged from the first area R1 heats the heat exchanger 50, then, heats the reformer 46, and then, heats the evaporator 48.

Then, after the temperature of the fuel cell module 12 is raised to a predetermined temperature, the oxygen-containing gas is supplied to the heat exchanger 50, and the mixed gas of the raw fuel and the water vapor is supplied to the reformer 46.

Specifically, the opening angle of the oxygen-containing gas regulator valve 122 is adjusted such that the flow rate of the air supplied to the oxygen-containing gas supply pipe 72 is increased, and the opening angle of the raw fuel regulator valve 116 is adjusted such that the flow rate of the raw fuel supplied to the raw fuel supply channel 88 is increased. Further, by operation of the water supply apparatus 18, the water is supplied to the water channel 100.

Thus, as shown in FIGS. 2 and 3, the air which flowed into the heat exchanger 50 is temporarily supplied to the oxygen-containing gas supply chamber 70a. While the air is moving inside the heat exchange pipes 64, the air is heated by heat exchange with the combustion gas supplied into the second area R2. After the heated air is temporarily supplied to the oxygen-containing gas discharge chamber 70b, the air is supplied to the oxygen-containing gas supply passage 42a of the fuel cell stack 24 through the oxygen-containing gas channel 74 (see FIG. 1).

In the fuel cell stack 24, after the heated air flows through the oxygen-containing gas flow field 38, the oxygen-containing gas (air) is discharged from the oxygen-containing gas discharge passage 42b into the oxygen-containing exhaust gas channel 63a. The oxygen-containing exhaust gas channel 63a is opened to the inside of the first partition plate 60a of the exhaust gas combustor 52, and the oxygen-containing exhaust gas flows into the first partition plate 60a.

Further, as shown in FIG. 1, the water from the water supply apparatus 18 is supplied to the evaporator 48. After sulfur is removed from the raw fuel at the desulfurizer 118, the raw fuel flows through the raw fuel supply channel 88, and moves toward the reformer 46.

In the evaporator 48, after the water is temporarily supplied to the water supply chamber 98a, while water is moving inside the evaporation pipes 92, the water is heated by the combustion gas flowing through the fourth area R4, and vaporized. After the water vapor flows into the water vapor discharge chamber 98b, the water vapor is supplied to the evaporation return pipe 102 connected to the water vapor discharge chamber 98b. Thus, the water vapor flows inside the evaporation return pipe 102, and flows into the raw fuel supply channel 88. Then, the water vapor is mixed with the raw fuel to produce the mixed gas.

The mixed gas from the raw fuel supply channel 88 is temporarily supplied to the mixed gas supply chamber 82a of the reformer 46. The mixed gas moves inside the reforming pipes 76. In the meanwhile, the mixed gas is heated by the combustion gas flowing through the third area R3. By the reforming catalyst 84, steam reforming is performed. After removal (reforming) of hydrocarbon of $C_{2+}$, a reformed gas chiefly containing methane is obtained.

After this reformed gas is heated, the reformed gas is temporarily supplied to the reformed gas discharge chamber 82b as the heated fuel gas. Thereafter, the fuel gas is supplied to the fuel gas supply passage 44a of the fuel cell stack 24 through the fuel gas channel 90 (see FIG. 1).

In the fuel cell stack 24, after the heated fuel gas flows through the fuel gas flow field 40, the fuel gas is discharged from the fuel gas discharge passage 44b into the fuel exhaust gas channel 63b. The fuel exhaust gas channel 63b is opened to the inside of the first partition plate 60a of the exhaust gas combustor 52, and the fuel exhaust gas is supplied into the first partition plate 60a.

Under the heating operation by the start-up combustor 54, when the temperature of the fuel gas in the exhaust gas combustor 52 exceeds the self-ignition temperature, combustion of the oxygen-containing exhaust gas and the fuel exhaust gas is started inside the first partition plate 60a.

In the first embodiment, the FC peripheral equipment 56 includes the first area R1 where the exhaust gas combustor 52 and the start-up combustor 54 are provided, the annular second area R2 around the first area R1 where the heat exchanger 50 is provided, the annular third area R3 around the second area R2 where the reformer 46 is provided, and the annular fourth area R4 around the third area R3 where the evaporator 48 is provided.

That is, the first area R1 is provided at the center, the annular second area R2 is provided around the first area R1, and the annular third area R3 is provided around the second area R2, and the annular fourth area R4 is provided around the third area R3, successively. In the structure, high temperature equipment with a large heat demand such as the heat exchanger 50 (and the reformer 46) can be provided inside, and low temperature equipment with a small heat demand such as the evaporator 48 can be provided outside.

For example, the heat exchanger 50 requires the temperature in a range of 550° C. to 650° C., and the reformer 46 requires the temperature in a range of 550° C. to 600° C. The evaporator 48 requires the temperature in a range of 150° C. to 200° C.

Thus, improvement in the heat efficiency is achieved, and thermally self-sustaining operation is facilitated. Further, simple and compact structure is achieved. In particular, since the heat exchanger 50 is provided inside the reformer 46, in an environment where the A/F (air/fuel gas) ratio is relatively low, the reformer 46 suitable for reforming at low temperature can be used advantageously. Thermally self-sustaining operation herein means operation where the operating temperature of the fuel cell 22 is maintained using only heat energy generated in the fuel cell 22, without supplying additional heat from the outside.

The heat exchanger 50 includes the annular oxygen-containing gas supply chamber 70a, the annular oxygen-containing gas discharge chamber 70b, the heat exchange pipes 64, and the second combustion gas channel 126b. The oxygen-containing gas is supplied to the oxygen-containing gas supply chamber 70a, and the heated oxygen-containing gas is discharged to the oxygen-containing gas discharge chamber 70b. The heat exchange pipes 64 are connected to the oxygen-containing gas supply chamber 70a at one end, and connected to the oxygen-containing gas discharge chamber 70b at the other end. The second combustion gas channel 126b supplies the combustion gas into the space between the heat exchange pipes 64.

Thus, the structure of the heat exchanger 50 is simplified easily, and the production cost is reduced effectively. Further, by changing the volumes of the oxygen-containing gas supply chamber 70a and the oxygen-containing gas discharge chamber 70b, the length, the diameter, and the number of the pipes, the desired operation can be achieved in various operating conditions, and a wider variety of designs become available.

Further, in the first embodiment, the first circumscribed non-uniform flow suppression plate 104 is provided in the second area R2 (the second combustion gas channel 126b) where the heat exchanger 50 is provided, along the minimum circumscribed circle which contacts the outer surfaces of the plurality of the heat exchange pipes 64. In the structure, as shown in FIG. 6, the combustion gas which flows from the first area R1 to the second area R2 (second combustion gas channel 126b) is blown onto the first circumscribed non-uniform flow suppression plate 104 facing the first combustion gas hole 62a.

Thus, the combustion gas moves along the first circumscribed non-uniform flow suppression plate 104 in the direction indicated by the arrow A1, and the combustion gas is blown onto each of the heat exchange pipes 64 which contact the first circumscribed non-uniform flow suppression plate 104. Further, after the combustion gas moves along the first circumscribed non-uniform flow suppression plate 104 in the direction indicated by the arrow A1, the combustion gas moves toward the second partition plate 60b at the bottom of the second combustion gas channel 126b, and flows through the second combustion gas hole 62b into the third area R3.

In the structure, after the combustion gas flows into the second area R2, by the guidance of the first circumscribed non-uniform flow suppression plate 104 facing the first combustion gas hole 62a, the combustion gas flows along the outer surfaces of the heat exchange pipes 64 suitably. Thus, non-uniform flow and blow-through of the combustion gas are suppressed suitably, and the channel of the combustion gas is sufficiently long. Accordingly, the quantity of the heat passed from the combustion gas to the oxygen-containing gas is increased, and improvement in the heat exchange efficiency is achieved suitably.

The second circumscribed non-uniform flow suppression plate 106 is provided in the third area R3 where the reformer 46 is provided. As shown in FIG. 6, after the combustion gas flows from the second area R2 to the third area R3 (third combustion gas channel 126c), the fuel gas is blown onto the second circumscribed non-uniform flow suppression plate 106 facing the second combustion gas hole 62b.

In the structure, the combustion gas moves along the second circumscribed non-uniform flow suppression plate 106 in the direction indicated by the arrow A2, and then, the combustion gas is blown onto the reforming pipes 76 which contacts the second circumscribed non-uniform flow suppression plate 106. Further, after combustion gas moves along the second circumscribed non-uniform flow suppression plate 106 in the direction indicated by the arrow A2, the combustion gas moves toward the third partition plate 60c at the upper portion of the third combustion gas channel 126c. Then, the combustion gas flows through the third combustion gas hole 62c into the fourth area R4.

Therefore, after the combustion gas flows into the third area R3, by the guidance of the second circumscribed non-uniform flow suppression plate 106, the combustion gas flows along the outer surfaces of the reforming pipes 76 suitably. Thus, non-uniform flow and blow-through of the combustion gas are suppressed suitably, and the channel of the combustion gas is sufficiently long. Accordingly, the quantity of the heat passed from the combustion gas to the mixed gas is increased, and improvement in the heat exchange efficiency is achieved suitably.

The third circumscribed non-uniform flow suppression plate 108 is provided in the fourth area R4 where the evaporator 48 is provided. As shown in FIG. 6, the combustion gas flows from the third area R3 to the fourth area R4 (fourth combustion gas channel 126d), and then, the combustion gas is blown onto the third circumscribed non-uniform flow suppression plate 108 facing the third combustion gas hole 62c. Thus, the combustion gas moves along the third circumscribed non-uniform flow suppression plate 108 in the direction indicated by the arrow A1, and the combustion gas is blown onto the evaporation pipes 92 which contact the third circumscribed non-uniform flow suppression plate 108.

Further, after the combustion gas moves along the third circumscribed non-uniform flow suppression plate 108 in the direction indicated by the arrow A1, the combustion gas moves toward the fourth partition plate 60d at the lower portion of the fourth combustion gas channel 126d. The combustion gas is discharged through the fourth combustion gas hole 62d.

In the structure, after the combustion gas flows into the fourth area R4, by the guidance of the third circumscribed non-uniform flow suppression plate 108, the combustion gas flows along the outer surfaces of the evaporation pipes 92 suitably. Thus, non-uniform flow and blow-through of the combustion gas are suppressed suitably, and the channel of the combustion gas is sufficiently long. Accordingly, the quantity of the heat passed from the combustion gas to the water is increased, and improvement in the heat exchange efficiency is achieved suitably.

Further, the first partition plate 60a, the second partition plate 60b, the third partition plate 60c as partitions between the first area R1, the second area R2, the third area R3, and the fourth area R4, respectively have the first combustion gas hole 62a, the second combustion gas hole 62b, and the third combustion gas hole 62c for allowing the combustion gas to flow through the first area R1, the second area R2, the third area R3, and the fourth area R4.

In the structure, blow-through of the combustion gas can be suppressed suitably, further improvement in the heat efficiency is achieved, and thermally self-sustaining operation is facilitated reliably.

Further, the positions of the first combustion gas hole 62a, the second combustion gas hole 62b, and the third combustion gas hole 62c can be determined depending on the priorities such as the heat efficiency, durability, and size reduction in the second area R2, the third area R3, and the fourth area R4. Accordingly, the target heat exchange efficiency can be determined freely, and a wider variety of designs become available.

Further, in the first embodiment, as shown in FIGS. 2, 3, and 6, the reformer 46 includes the annular mixed gas supply chamber 82a, the annular reformed gas discharge chamber 82b, the reforming pipes 76, and the third combustion gas channel 126c. The mixed gas is supplied to the mixed gas supply chamber 82a, and the produced fuel gas is discharged to the reformed gas discharge chamber 82b. The reforming pipes 76 are connected to the mixed gas supply chamber 82a at one end, and connected to the reformed gas discharge chamber 82b at the other end. The third combustion gas channel 126c supplies the combustion gas into the space between the reforming pipes 76.

Thus, the structure of the reformer 46 is simplified easily, and the production cost is reduced effectively. Further, by changing the volumes of the mixed gas supply chamber 82a and the reformed gas discharge chamber 82b, the length, the diameter, and the number of the pipes, the desired operation can be achieved in various operating conditions, and a wider variety of designs become available.

Further, the evaporator 48 includes the annular water supply chamber 98a, the annular water vapor discharge chamber 98b, the evaporation pipes 92, and the fourth combustion gas channel 126d. The water is supplied to the water supply chamber 98a, and the water vapor is discharged to the water vapor discharge chamber 98b. The evaporation pipes 92 are connected to the water supply chamber 98a at one end, and connected to the water vapor discharge chamber 98b at the other end. The fourth combustion gas channel 126d supplies the combustion gas into the space between the evaporation pipes 92.

Thus, the structure of the evaporator 48 is simplified easily, and the production cost is reduced effectively. Further, by changing the volumes of the water supply chamber 98a and the water vapor discharge chamber 98b, the length, the diameter, and the number of the pipes, the desired operation can be achieved in various operating conditions, and a wider variety of designs become available.

Further, the fuel cell module 12 is a solid oxide fuel cell module. Therefore, the fuel cell module 12 is particularly suitable for high temperature type fuel cells such as SOFC.

Figure 7:
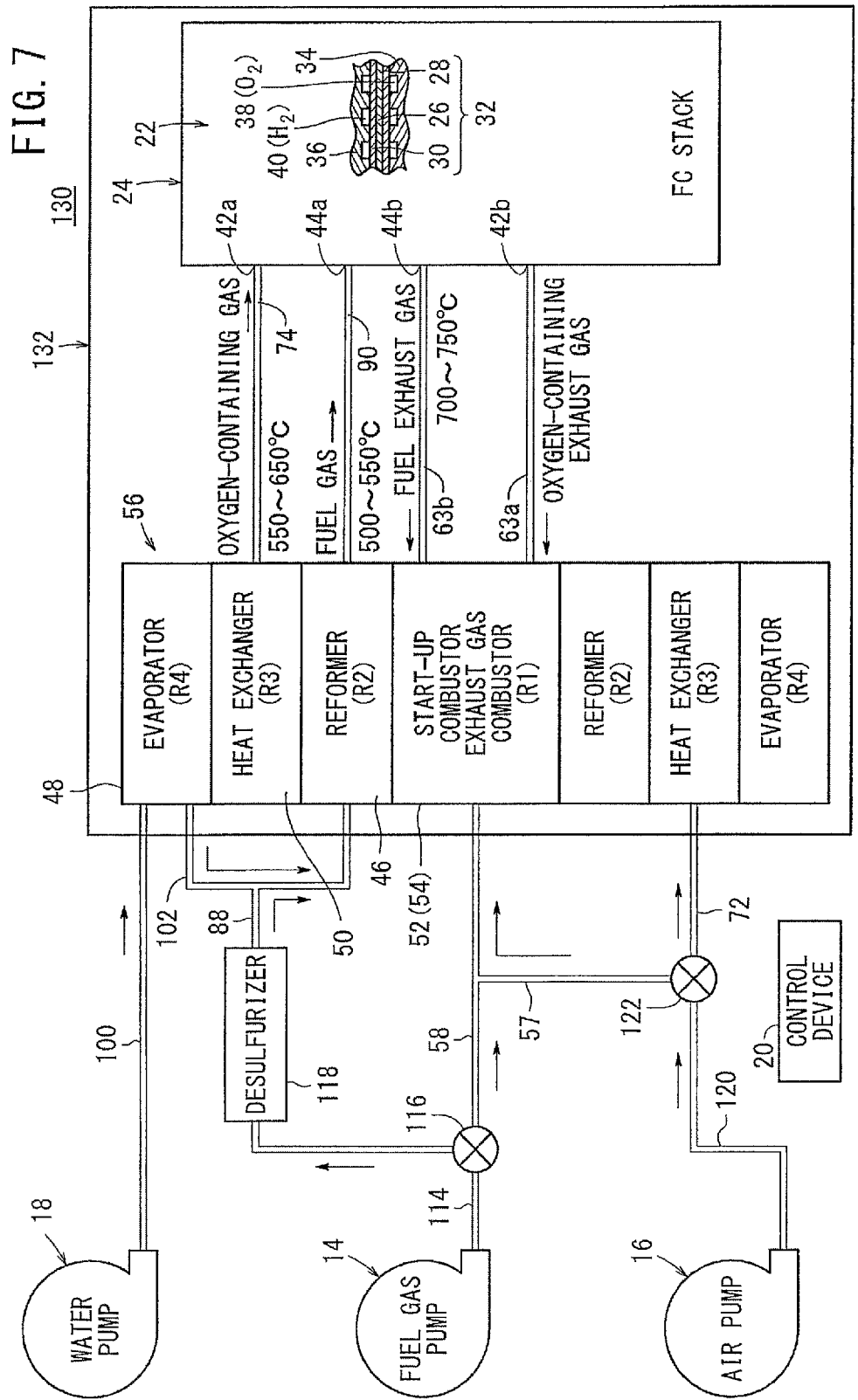
FIG. 7 is a diagram schematically showing structure of a fuel cell system including a fuel cell module according to a second embodiment of the present invention.

As shown in FIG. 7, a fuel cell system 130 includes a fuel cell module 132 according to a second embodiment of the present invention. The constituent elements of the fuel cell module 132 according to the second embodiment of the present invention that are identical to those of the fuel cell system 10 according to the first embodiment are labeled with the same reference numerals, and descriptions thereof will be omitted.

Figure 8:
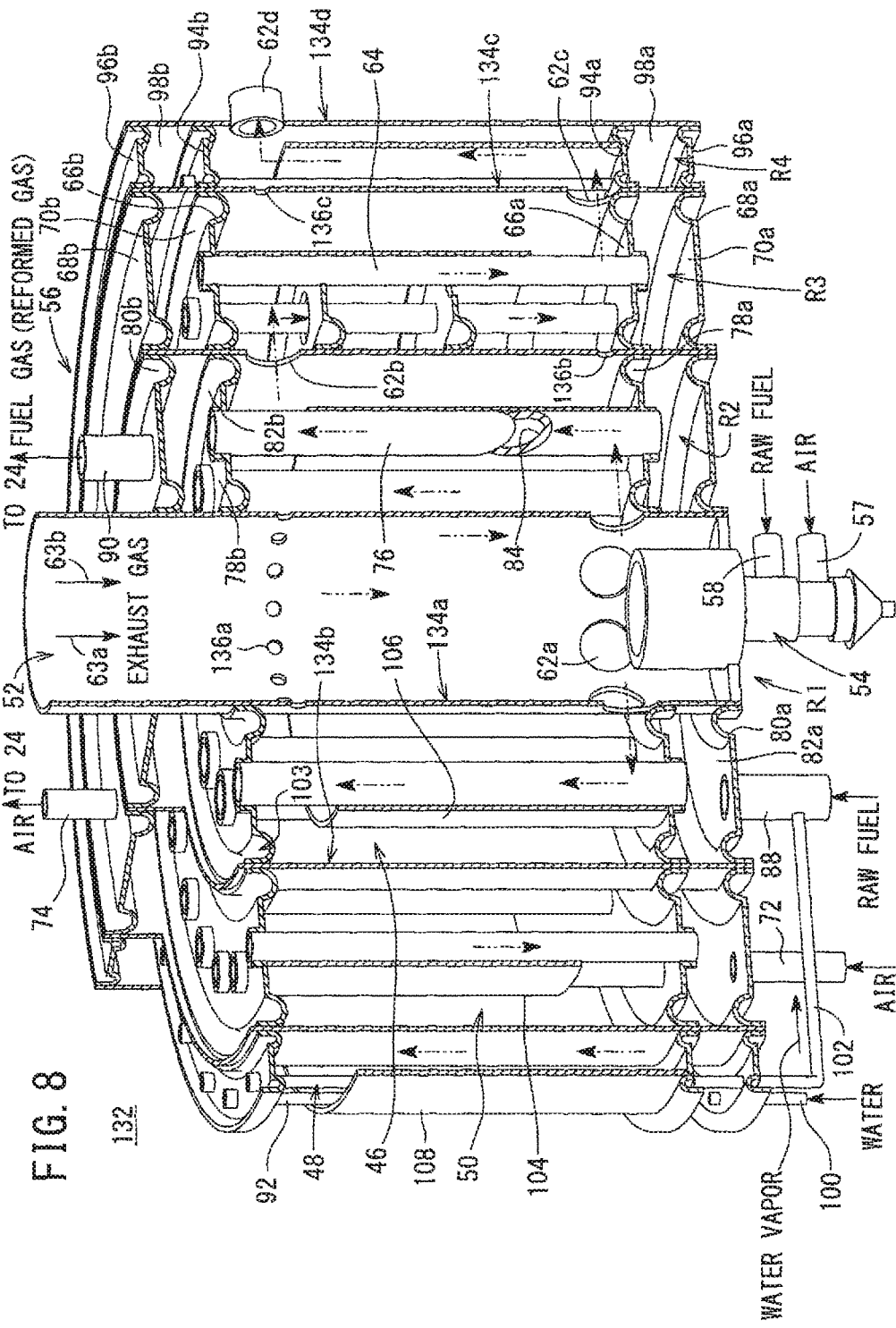
FIG. 8 is a perspective view with partial omission showing FC peripheral equipment of the fuel cell module.

As shown in FIG. 8, FC peripheral equipment 56 of the fuel cell module 132 includes a first area R1 comprising, e.g., a circular opening where an exhaust gas combustor 52 and a start-up combustor 54 are provided, an annular second area R2 around the first area R1 where a reformer 46 is provided, an annular third area R3 around the second area R2 where the heat exchanger 50 is provided, and an annular fourth area R4 around the third area R3 where an evaporator 48 is provided.

The FC peripheral equipment 56 includes a first partition plate 134a provided between the first area R1 and the second area R2, a second partition plate 134b provided between the second area R2 and the third area R3, a third partition plate 134c provided between the third area R3 and the fourth area R4, and a fourth partition plate 134d around the fourth area R4.

Figure 9:
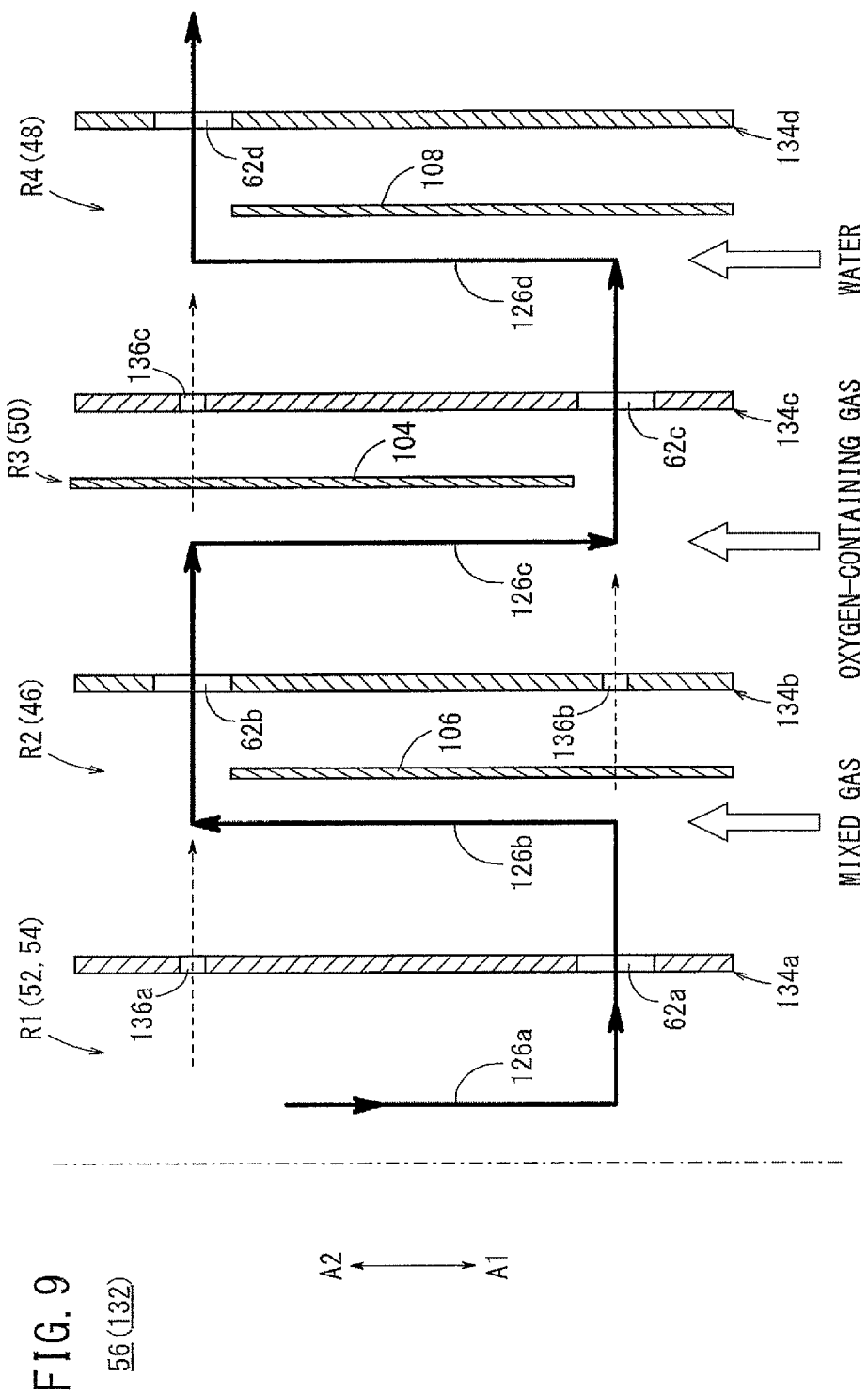
FIG. 9 is a view showing gas flows of a combustion gas in the FC peripheral equipment.

As shown in FIGS. 8 and 9, first combustion gas holes 62a are provided adjacent to the end of the first partition plate 134a opposite to the fuel cell stack 24, second combustion gas holes 62b are provided adjacent to the end of the second partition plate 134b closer to the fuel cell stack 24, third combustion gas holes 62c are provided adjacent to the end of the third partition plate 134c opposite to the fuel cell stack 24, and fourth combustion gas holes 62d are provided adjacent to the end of the fourth partition plate 134d closer to the fuel cell stack 24.

A plurality of gas extraction holes 136a are formed in the first partition plate 134a on the side opposite to the first combustion gas holes 62a. Each of the gas extraction holes 136a has an opening which is smaller than that of the first combustion gas holes 62a. The gas extraction holes 136a are formed at positions facing the second combustion gas holes 62b formed in the second partition plate 134b. A plurality of gas extraction holes 136b are formed in the second partition plate 134b at positions facing the third combustion gas holes 62c formed in the third partition plate 134c. A plurality of gas extraction holes 136c are formed in the third partition plate 134c at positions facing the fourth combustion gas holes 62d formed in the fourth partition plate 134d. The gas extraction holes 136b, 136c are not essential, and should be provided as necessary.

A plurality of heat exchange pipes 64 are provided in the third area R3 (third combustion gas channel 126c) where the heat exchanger 50 is provided. The first circumscribed non-uniform flow suppression plate 104 is provided in the third area R3 along the minimum circumscribed circle which contacts the outer surfaces of the plurality of heat exchange pipes 64.

The upper end of the first circumscribed non-uniform flow suppression plate 104 is positioned above the second combustion gas hole 62b, and the lower end of the first circumscribed non-uniform flow suppression plate 104 is positioned above the third combustion gas hole 62c. As shown in FIG. 8, the upper end of the first circumscribed non-uniform flow suppression plate 104 contacts the first inner ring 66b.

A plurality of reforming pipes 76 are provided in the second area R2 where the reformer 46 is provided. The second circumscribed non-uniform flow suppression plate 106 is provided in the second area R2 along the minimum circumscribed circle which contacts the outer surfaces of the plurality of reforming pipes 76. As shown in FIG. 8, the lower end of the second circumscribed non-uniform flow suppression plate 106 contacts the second inner ring 78a.

The lower end of the second circumscribed non-uniform flow suppression plate 106 is positioned below the first combustion gas hole 62a, and the upper end of the second circumscribed non-uniform flow suppression plate 106 is positioned below the second combustion gas hole 62b.

A plurality of evaporation pipes 92 are provided in the fourth area R4 where the evaporator 48 is provided. The third circumscribed non-uniform flow suppression plate 108 is provided in the fourth area R4 along the minimum circumscribed circle which contacts the outer surfaces of the plurality of evaporation pipes 92.

The lower end of the third circumscribed non-uniform flow suppression plate 108 is positioned below the third combustion gas hole 62c, and the upper end of the third circumscribed non-uniform flow suppression plate 108 is positioned below the fourth combustion gas hole 62d. As shown in FIG. 8, the lower end of the third circumscribed non-uniform flow suppression plate 108 contacts the third inner ring 94a.

In the second embodiment, the fuel cell module 132 includes the first area R1 where the exhaust gas combustor 52 and the start-up combustor 54 are provided, the annular second area R2 around the first area R1 where the reformer 46 is provided, the annular third area R3 around the second area R2 where the heat exchanger 50 is provided, and the annular fourth area R4 around the third area R3 where the evaporator 48 is provided.

In the structure, high temperature equipment with a large heat demand such as the reformer 46 (and the heat exchanger 50) can be provided inside, and low temperature equipment with a small heat demand such as the evaporator 48 can be provided outside. Thus, improvement in the heat efficiency is achieved, and thermally self-sustaining operation is facilitated. Further, simple and compact structure is achieved.

Moreover, in the heat exchanger 50, as shown in FIG. 9, the combustion gas moves along the first circumscribed non-uniform flow suppression plate 104 in the direction indicated by the arrow A1, and the combustion gas is blown onto the heat exchange pipes 64 which contact the first circumscribed non-uniform flow suppression plate 104. Accordingly, the quantity of the heat passed from the combustion gas to the oxygen-containing gas is increased, and improvement in the heat exchange efficiency is achieved suitably.

In the reformer 46, the combustion gas moves along the second circumscribed non-uniform flow suppression plate 106 in the direction indicated by the arrow A2, and the combustion gas is blown onto the reforming pipes 76 which contact the second circumscribed non-uniform flow suppression plate 106. Accordingly, the quantity of the heat passed from the combustion gas to the mixed gas is increased, and improvement in the heat exchange efficiency is achieved suitably.

Further, in the evaporator 48, the combustion gas moves along the third circumscribed non-uniform flow suppression plate 108 in the direction indicated by the arrow A2, and the combustion gas is blown onto the evaporation pipes 92 which contact the third circumscribed non-uniform flow suppression plate 108. Accordingly, the quantity of the heat passed from the combustion gas to the water is increased, and improvement in the heat exchange efficiency is achieved suitably.

Figure 10:
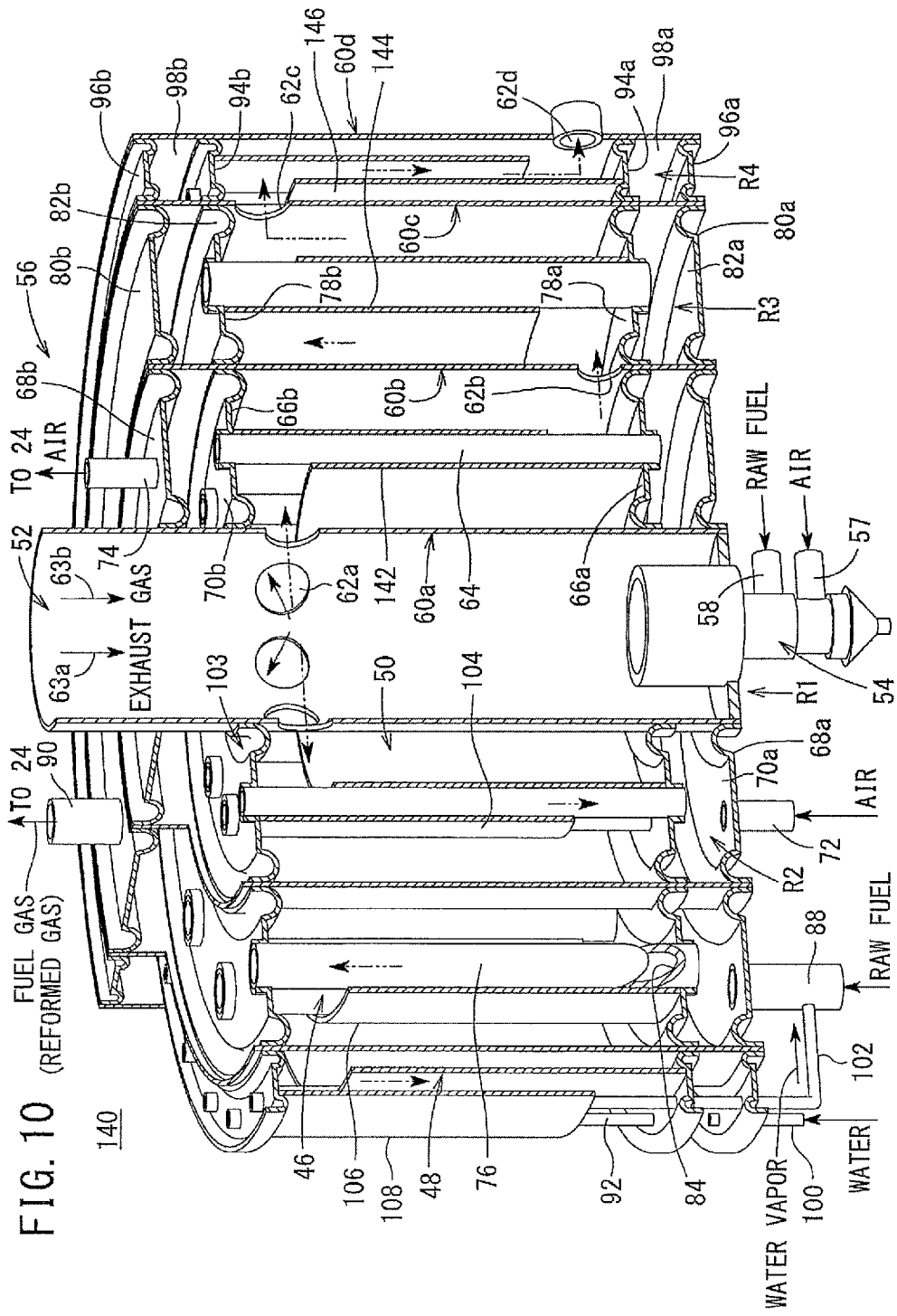
FIG. 10 is a perspective view with partial omission showing FC peripheral equipment of a fuel cell module according to a third embodiment of the present invention.
Figure 11:
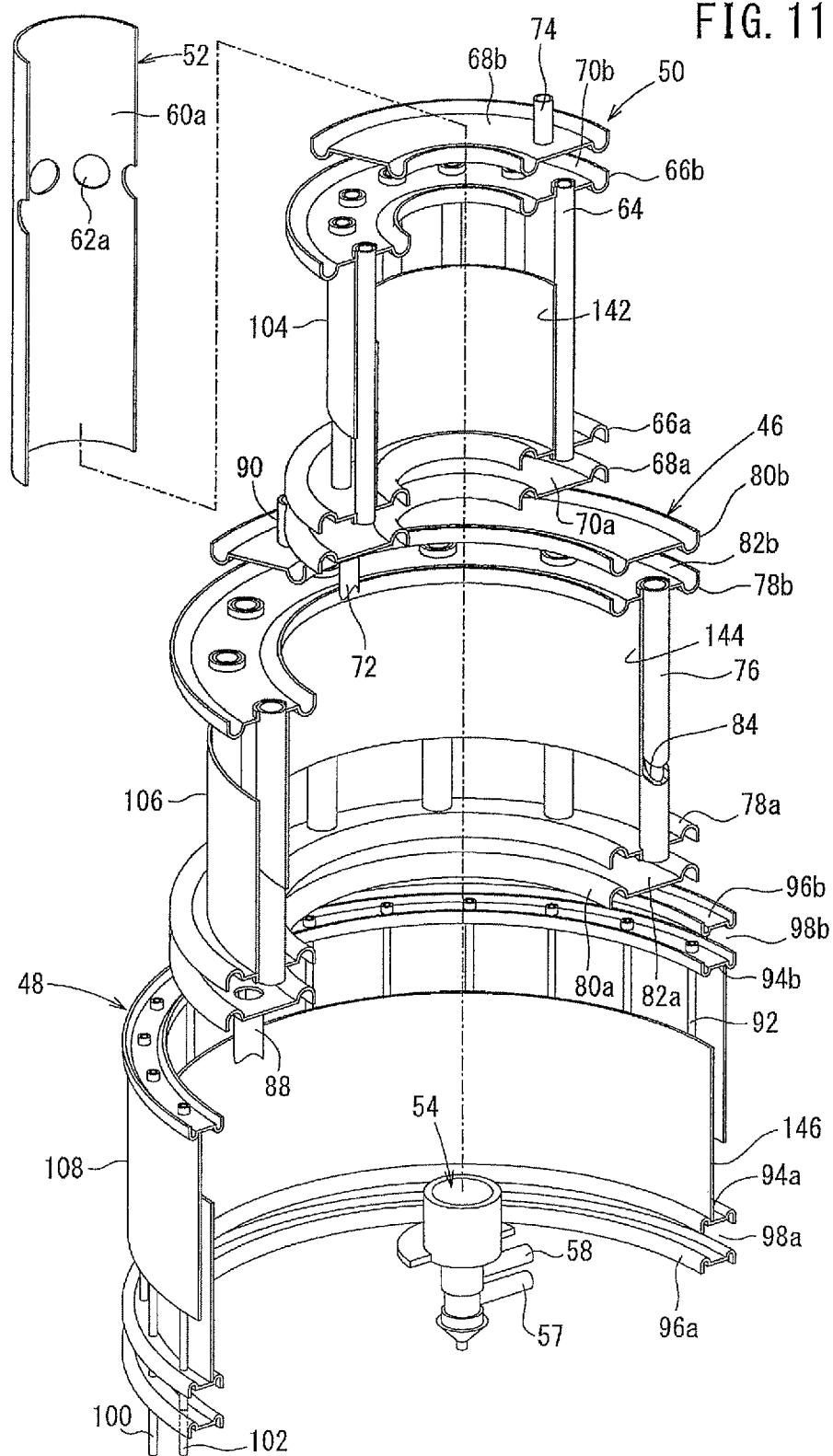
FIG. 11 is an exploded perspective view showing main components of the FC peripheral equipment.

FIG. 10 is a perspective view with partial omission showing FC peripheral equipment 56 of a fuel cell module 140 according to a third embodiment of the present invention.

The constituent elements of the fuel cell module 140 that are identical to those of the fuel cell module 12 according to the first embodiment are labeled with the same reference numerals, and descriptions thereof is omitted. Further, the third embodiment may have the same structure as the second embodiment, and the detailed description thereof is omitted.

In the fuel cell module 140, as shown in FIGS. 10 to 13, a first inscribed non-uniform flow suppression plate 142 is provided in the second area R2 where the heat exchanger 50 is provided, along the maximum inscribed circle which contacts the outer surfaces of a plurality of heat exchange pipes 64. As with the case of the first circumscribed non-uniform flow suppression plate 104, the first inscribed non-uniform flow suppression plate 142 is made of a thin metal plate. The first inscribed non-uniform flow suppression plate 142 has a cylindrical shape formed along the maximum inscribed circle which contacts the outer surfaces of a plurality of heat exchange pipes 64. For example, the first inscribed non-uniform flow suppression plate 142 is fixed to the heat exchange pipes 64 by welding or the like.

Figure 12:
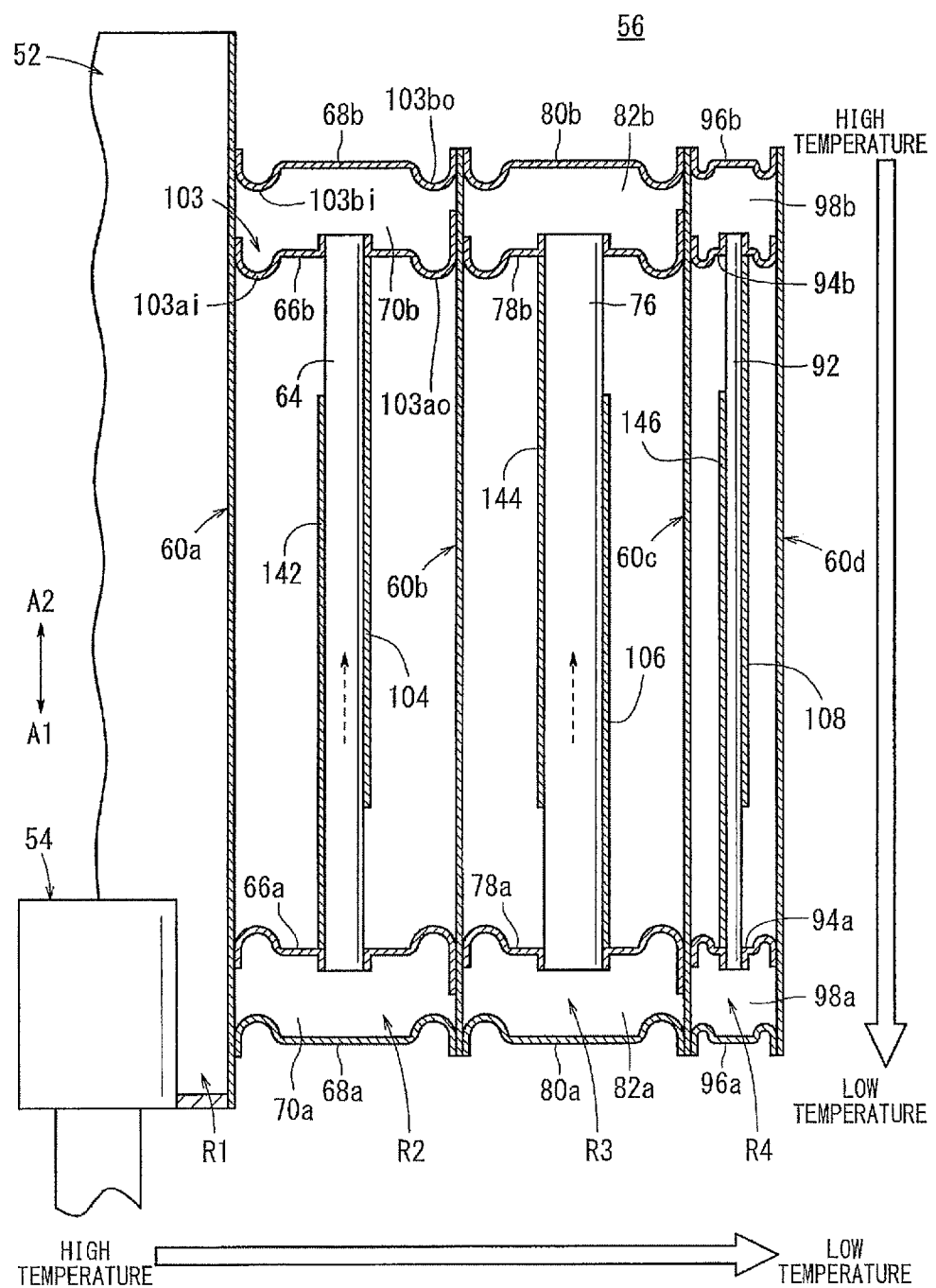
FIG. 12 is a view showing temperature distribution in the FC peripheral equipment.
Figure 13:
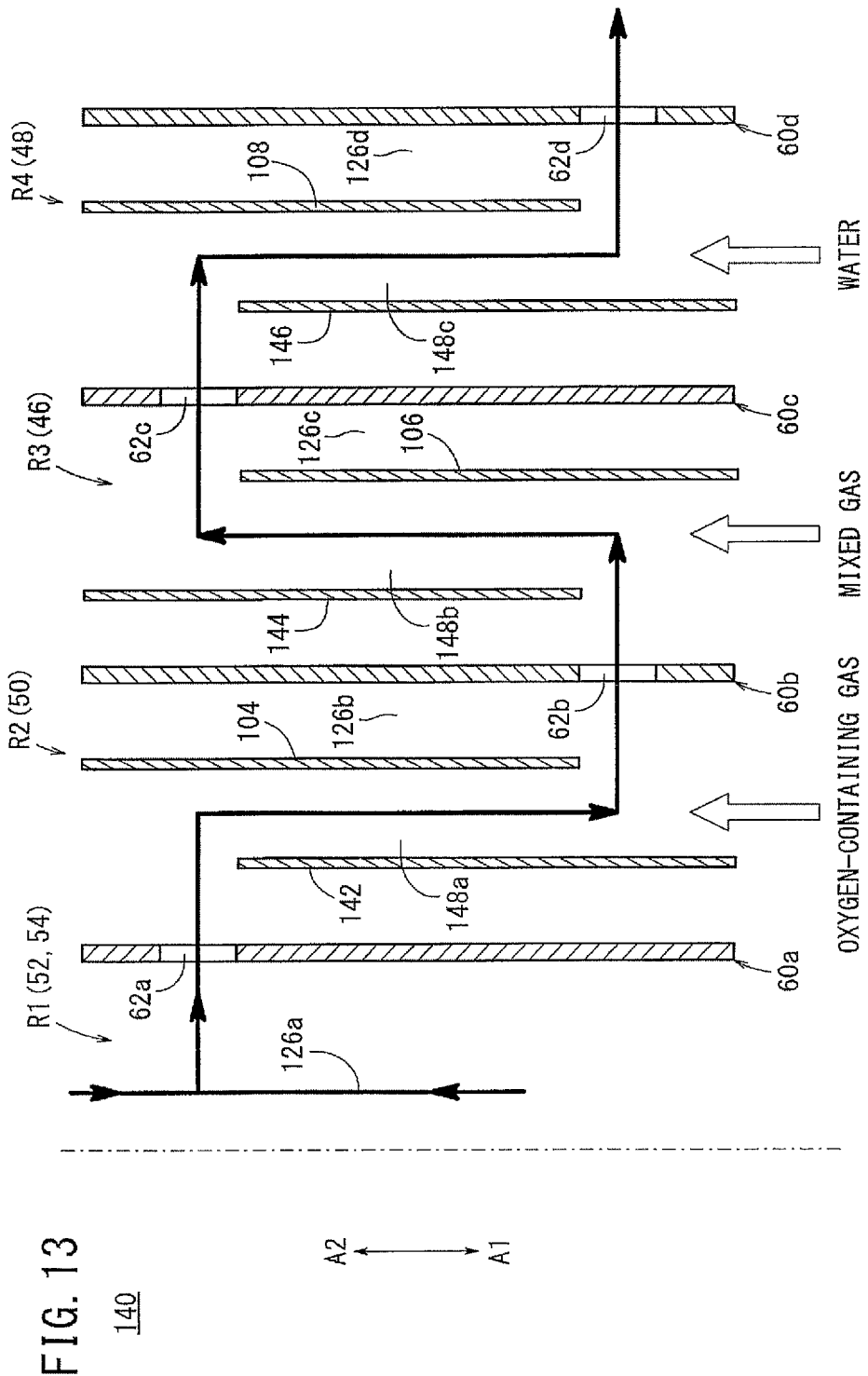
FIG. 13 is a view showing gas flows of a combustion gas in the FC peripheral equipment.

The ends of the first inscribed non-uniform flow suppression plate 142 and the first circumscribed non-uniform flow suppression plate 104 are offset from each other in the pipe length direction of the heat exchange pipes 64. The combustion gas flows in this pipe length direction. As shown in FIG. 13, the upper end of the first inscribed non-uniform flow suppression plate 142 is positioned below the first combustion gas hole 62a, and the lower end of the first inscribed non-uniform flow suppression plate 142 is positioned below the second combustion gas hole 62b. As shown in FIG. 12, the lower end of the first inscribed non-uniform flow suppression plate 142 contacts the first inner ring 66a. In effect, a heat insulating space is formed between the first inscribed non-uniform flow suppression plate 142 and the first partition plate 60a. The other inscribed non-uniform flow suppression plates described later also have the same structure.

As shown in FIGS. 10 to 13, a second inscribed non-uniform flow suppression plate 144 is provided in the third area R3 where the reformer 46 is provided, along the maximum inscribed circle which contacts the outer surfaces of a plurality of reforming pipes 76. As with the case of the second circumscribed non-uniform flow suppression plate 106, the second inscribed non-uniform flow suppression plate 144 is made of a thin metal plate. The second inscribed non-uniform flow suppression plate 144 has a cylindrical shape formed along the maximum inscribed circle which contacts the outer surfaces of the plurality of reforming pipes 76. For example, the second inscribed non-uniform flow suppression plate 144 is fixed to the reforming pipes 76 by welding or the like.

The ends of the second inscribed non-uniform suppression plate 144 and second circumscribed non-uniform flow suppression plate 106 are offset from each other in the length direction of the reforming pipes 76. The combustion gas flows in this length direction of the reforming pipes 76. As shown in FIG. 13, the lower end of the second inscribed non-uniform flow suppression plate 144 is positioned above the second combustion gas hole 62b, and the upper end of the second inscribed non-uniform flow suppression plate 144 is positioned above the third combustion gas hole 62c. As shown in FIG. 12, the upper end of the second inscribed non-uniform flow suppression plate 144 contacts the second inner ring 78b.

As shown in FIGS. 10 to 13, a third inscribed non-uniform flow suppression plate 146 is provided in the fourth area R4 where the evaporator 48 is provided, along the maximum inscribed circle which contacts the outer surfaces of a plurality of evaporation pipes 92. As in the case of the third circumscribed non-uniform flow suppression plate 108, the third inscribed non-uniform flow suppression plate 146 is made of a thin metal plate. The third inscribed non-uniform flow suppression plate 146 has a cylindrical shape formed along the maximum inscribed circle which contacts the outer surfaces of a plurality of evaporation pipes 92. For example, the third inscribed non-uniform flow suppression plate 146 is fixed to the evaporation pipes 92 by welding or the like.

The ends of the third inscribed non-uniform flow suppression plate 146 and the third circumscribed non-uniform flow suppression plate 108 are offset from each other in the pipe length direction of the evaporation pipes 92. The combustion gas flows in this pipe length direction. As shown in FIG. 13, the upper end of the third inscribed non-uniform flow suppression plate 146 is positioned below the third combustion gas hole 62c, and the lower end of the third inscribed non-uniform flow suppression plate 146 is positioned below the fourth combustion gas hole 62d. As shown in FIG. 12, the lower end of the third inscribed non-uniform flow suppression plate 146 contacts the third inner ring 94a.

In the third embodiment, in the second area R2 where the heat exchanger 50 is provided, the first circumscribed non-uniform flow suppression plate 104 is provided along the minimum circumscribed circle which contacts the outer surfaces of the plurality of heat exchange pipes 64, and the first inscribed non-uniform flow suppression plate 142 is provided along the maximum inscribed circle which contacts the outer surfaces of the heat exchange pipes 64.

In the structure, as shown in FIGS. 12 and 13, after the combustion gas flows into the second area R2 (second combustion gas channel 126b), the combustion gas flows above the first inscribed non-uniform flow suppression plate 142, and the combustion gas is blown onto the first circumscribed non-uniform flow suppression plate 104. Then, the combustion gas flows along a first flow channel 148a formed between the first circumscribed non-uniform flow suppression plate 104 the first inscribed non-uniform flow suppression plate 142 in the direction indicated by the arrow A1, and the combustion gas is blown onto the outer surfaces of the heat exchange pipes 64.

Thus, non-uniform flow and blow-through of the combustion gas supplied to the heat exchanger 50 are suppressed suitably, and the combustion gas flows along the heat exchange pipes 64 still more smoothly and reliably. Accordingly, the quantity of the heat passed from the combustion gas to the oxygen-containing gas is increased, and improvement in the heat exchange efficiency is achieved suitably.

Further, the ends of the first circumscribed non-uniform flow suppression plate 104 and the first inscribed non-uniform flow suppression plate 142 are offset from each other in the pipe length direction of the heat exchange pipes 64, and the combustion gas flows in this pipe length direction between the first circumscribed non-uniform flow suppression plate 104 and the first inscribed non-uniform flow suppression plate 142. In the structure, non-uniform flow and blow-through of the combustion gas are suppressed suitably, and the first flow channel 148a is provided between the first circumscribed non-uniform flow suppression plate 104 and the first inscribed non-uniform flow suppression plate 142. Thus, the first flow channel 148a of the combustion gas is sufficiently long, the quantity of the heat passed from the combustion gas is increased, and improvement in the heat exchange efficiency is achieved suitably.

After the combustion gas flows into the first flow channel 148a area in the direction indicated by the arrow A1, the combustion gas flows below the first circumscribed non-uniform flow suppression plate 104, and flows into the third area R3 through the second combustion gas hole 62b. After the combustion gas flows into the third area R3, the combustion gas flows below the second inscribed non-uniform flow suppression plate 144, and the combustion gas is blown onto the second circumscribed non-uniform flow suppression plate 106.

The combustion gas flows along a second flow channel 148b formed between the second circumscribed non-uniform flow suppression plate 106 and the second inscribed non-uniform flow suppression plate 144 in the direction indicated by the arrow A2, and the combustion gas is blown onto the outer surfaces of the reforming pipes 76.

Thus, non-uniform flow and blow-through of the combustion gas supplied to the reformer 46 are suppressed suitably, and the combustion gas flows along the reforming pipes 76 still more smoothly and reliably. Accordingly, the quantity of the heat passed from the combustion gas to the mixed gas is increased, and improvement in the heat exchange efficiency is achieved suitably.

Further, the ends of the second circumscribed non-uniform flow suppression plate 106 and the second inscribed non-uniform flow suppression plate 144 are offset from each other in the pipe length direction of the reforming pipes 76, and the combustion gas flows in this pipe length direction. In the structure, non-uniform flow and blow-through of the combustion gas are suppressed suitably, and the second flow channel 148b can be provided between the second circumscribed non-uniform flow suppression plate 106 and the second inscribed non-uniform flow suppression plate 144. Thus, the second flow channel 148b is sufficiently long, the quantity of the heat passed from the combustion gas is increased effectively, and improvement in the heat exchange efficiency is achieved suitably.

After the combustion gas flows through the second flow channel 148b in the direction indicated by the arrow A2, the combustion gas flows above the second circumscribed non-uniform flow suppression plate 106, and flows into the fourth area R4 through the third combustion gas hole 62c. After the combustion gas flows into the fourth area R4, the combustion gas flows above the third inscribed non-uniform flow suppression plate 146, and the combustion gas is blown onto the third circumscribed non-uniform flow suppression plate 108.

The combustion gas flows along a third flow channel 148c formed between the third circumscribed non-uniform flow suppression plate 108 and the third inscribed non-uniform flow suppression plate 146 in the direction indicated by the arrow A1, and the combustion gas is blown onto the outer surfaces of the evaporation pipes 92.

Thus, non-uniform flow and blow-through of the combustion gas supplied to the evaporator 48 are suppressed suitably, and the combustion gas flows along the evaporation pipes 92 still more smoothly and reliably. Accordingly, the quantity of the heat passed from the combustion gas to the water is increased, and improvement in the heat exchange efficiency is achieved suitably.

Further, the ends of the third circumscribed non-uniform flow suppression plate 108 and the third inscribed non-uniform flow suppression plate 146 are offset from each other in the pipe length direction of the evaporation pipes 92, and the combustion gas flows in this pipe length direction. In the structure, non-uniform flow and blow-through of the combustion gas are suppressed suitably, and the third flow channel 148c can be provided between the third circumscribed non-uniform flow suppression plate 108 and the third inscribed non-uniform flow suppression plate 146. In the structure, the third flow channel 148c is sufficiently long, the quantity of the heat passed from the combustion gas is increased, and improvement in the heat exchange efficiency is achieved suitably.

Figure 14:
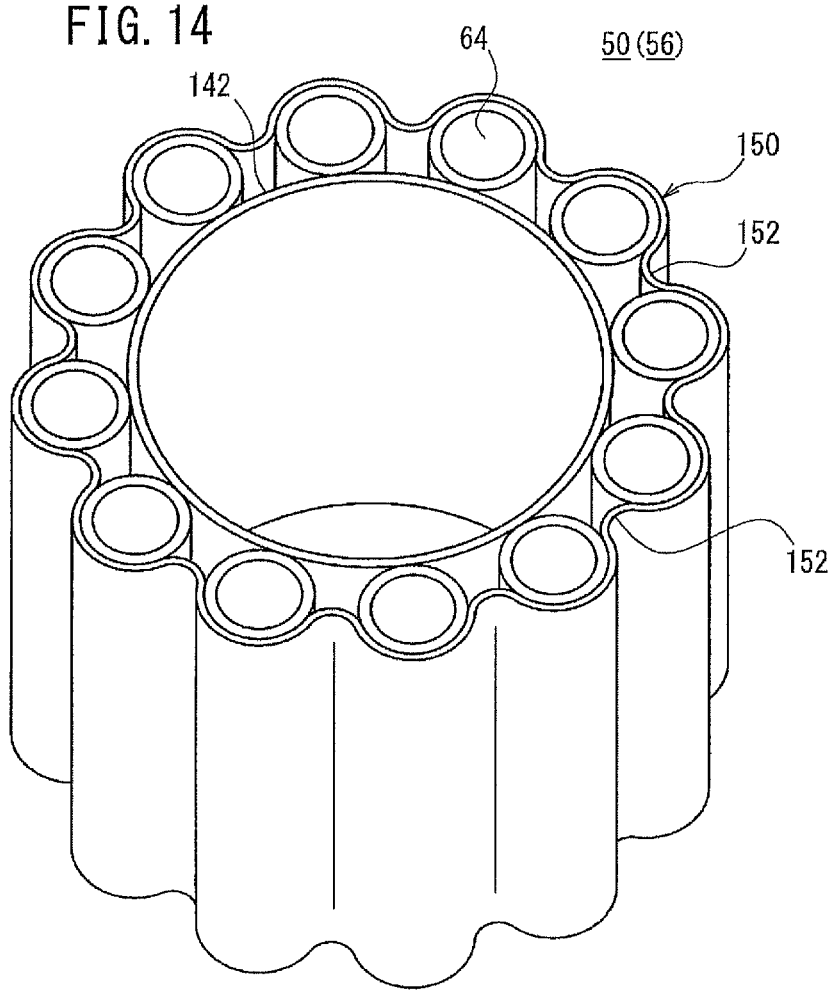
FIG. 14 is a perspective view showing main components of a heat exchanger equipped with a first circumscribed non-uniform flow suppression plate having another structure.
Figure 15:
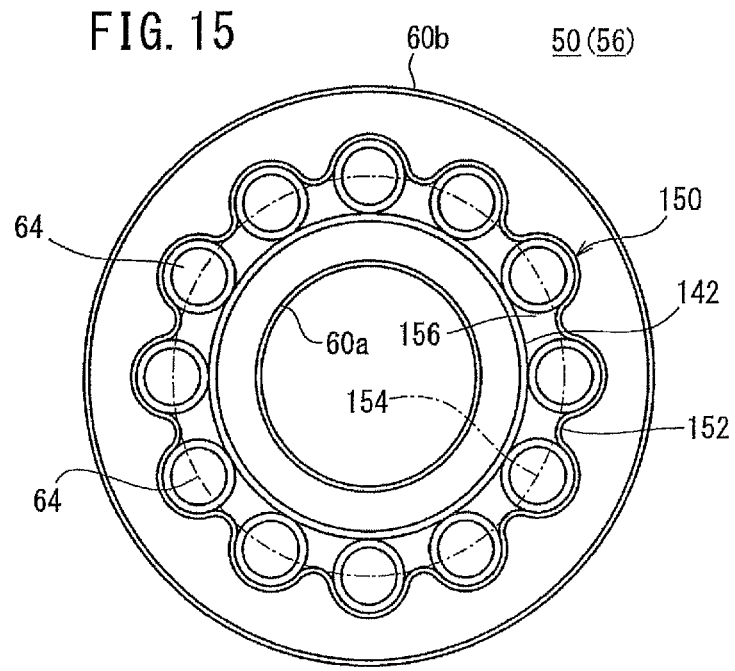
FIG. 15 is a plan view showing the heat exchange pipes shown in FIG. 14.
Figure 16:
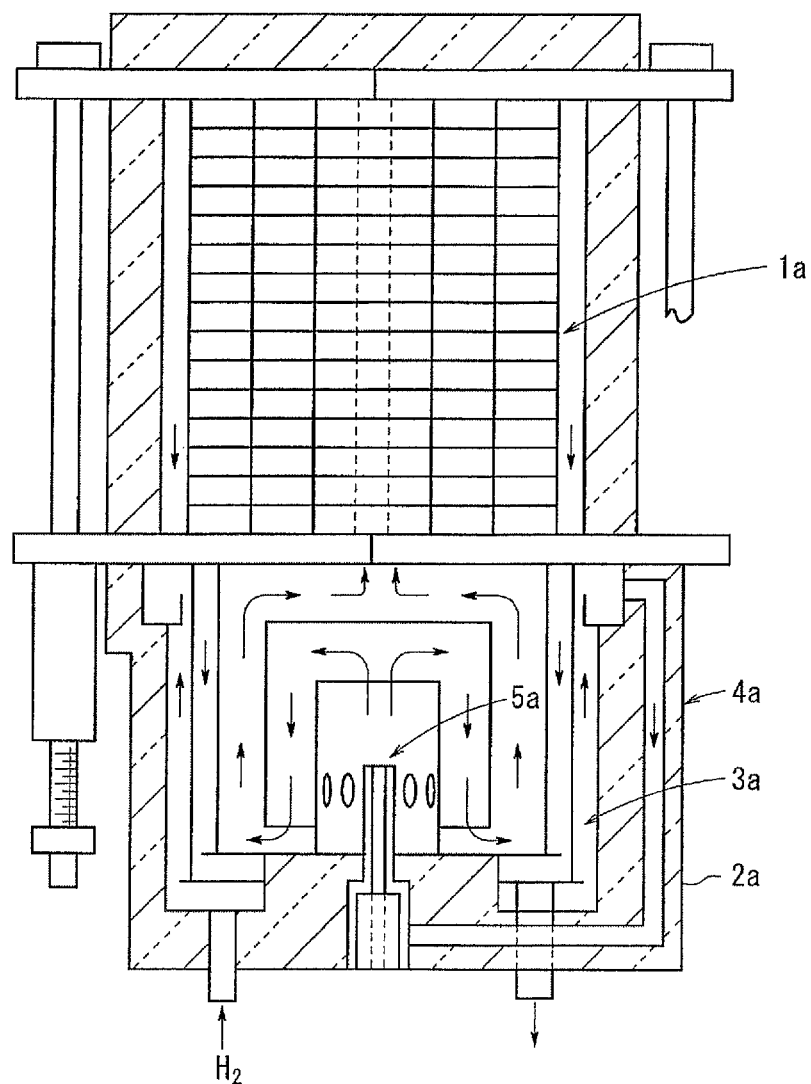
FIG. 16 is a view schematically showing a fuel cell battery disclosed in the conventional technique 1.
Figure 17:
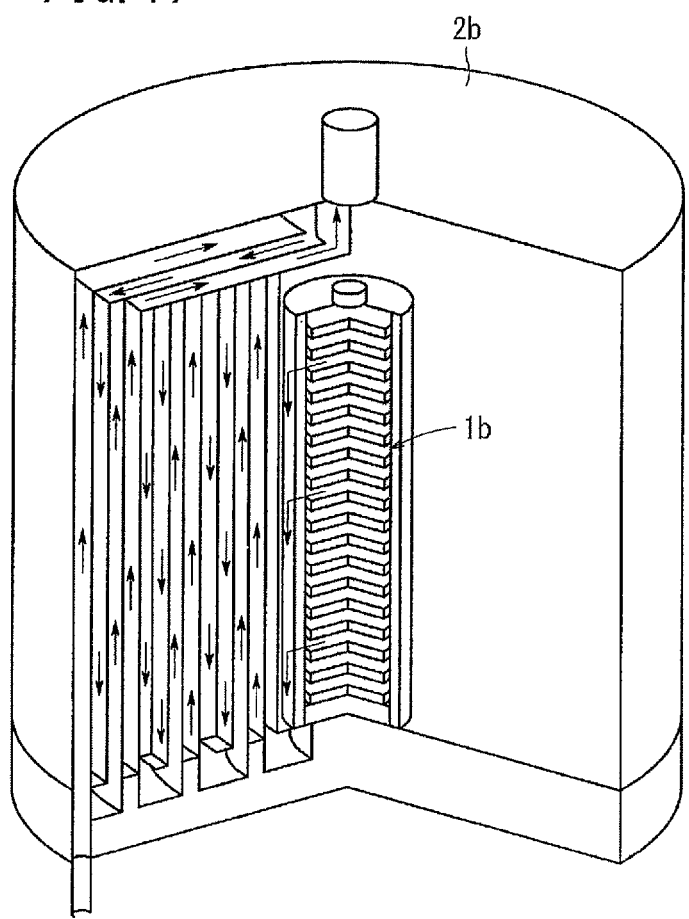
FIG. 17 is a perspective view with partial cutout showing a solid oxide fuel cell disclosed in the conventional technique 2.
Figure 18:
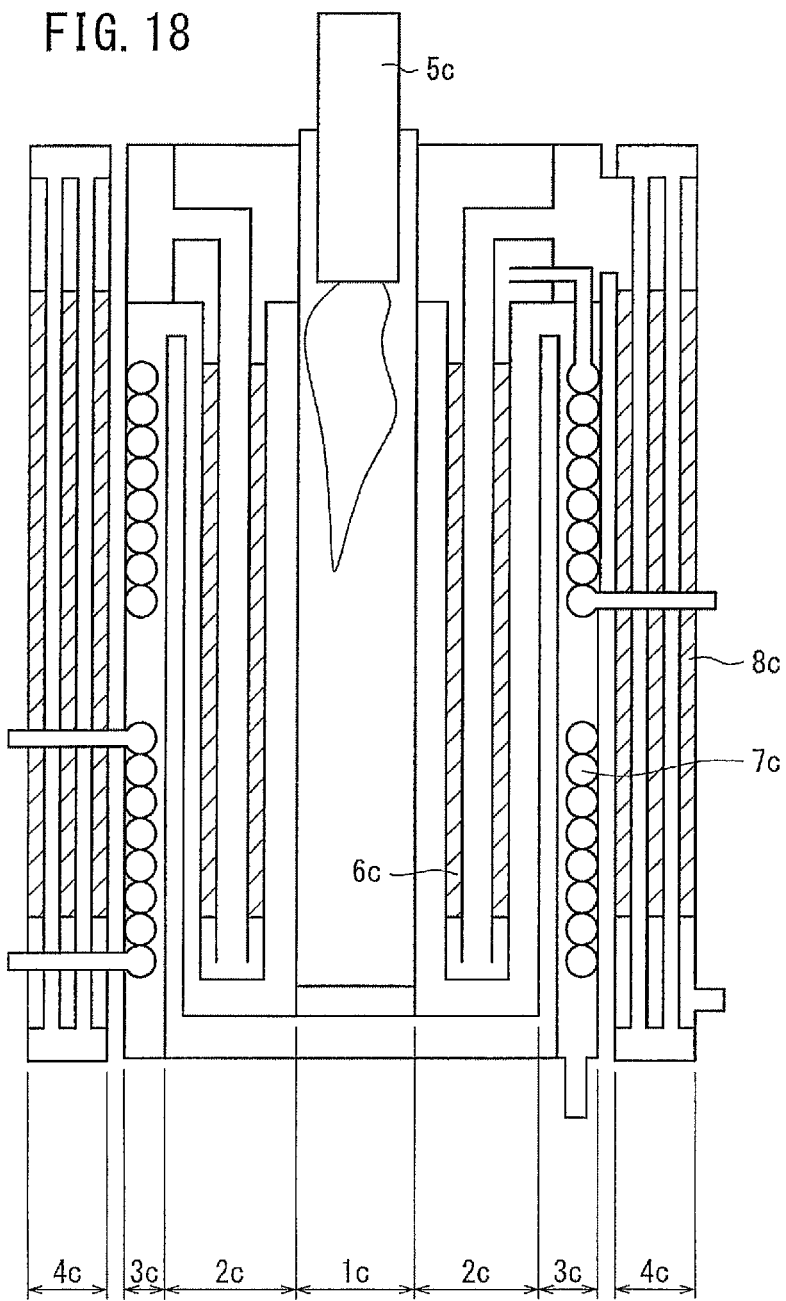
FIG. 18 is a view schematically showing a fuel cell system disclosed in the conventional technique 3.

In the first to third embodiments, the cylindrical first circumscribed non-uniform flow suppression plate 104 is used for the heat exchanger 50. However, the present invention is not limited in this respect. For example, as shown in FIGS. 14 and 15, a first circumscribed non-uniform flow suppression plate 150 made of a substantially wavy shape may be used.

The first circumscribed non-uniform flow suppression plate 150 is provided along the minimum circumscribed circle which contacts the outer surfaces of a plurality of heat exchange pipes 64, and includes inner protrusions 152 protruding between the heat exchange pipes 64. The inner protrusions 152 are provided along a virtual circle 154 connecting the centers of the heat exchange pipes 64, or folded adjacent to the virtual circle 154 such that the first circumscribed non-uniform flow suppression plate 150 contacts the outer surfaces over an angle of about 180°.

The cross sectional area of a combustion gas flow opening 156 formed by the first circumscribed non-uniform flow suppression plate 150, the first inscribed non-uniform flow suppression plate 142, and the outer surfaces of the heat exchange pipes 64 is the same as the total sectional area of the heat exchange pipes 64.

In the heat exchanger 50, the first circumscribed non-uniform flow suppression plate 150 has the substantially wavy shape, and contacts the outer surfaces of the heat exchange pipes 64. Therefore, further improvement in the efficiency of heat exchange between the combustion gas and the oxygen-containing gas is achieved suitably. Further, since the cross sectional area of the combustion gas flow opening 156 is the same as the total cross sectional area of the heat exchange pipes 64, improvement in the heat exchange efficiency is achieved, and thermally self-sustaining operation is facilitated.

It should be noted that the second circumscribed non-uniform flow suppression plate 106 of the reformer 46 and the third circumscribed non-uniform flow suppression plate 108 of the evaporator 48 may have the same structure as the first circumscribed non-uniform flow suppression plate 150.

Although certain embodiments of the present invention have been shown and described in detail, it should be understood that various changes and modifications may be made to the embodiments without departing from the scope of the invention.

The invention claimed is:

1. A fuel cell module comprising:
   a fuel cell stack formed by stacking a plurality of fuel cells for generating electricity by electrochemical reactions of a fuel gas and an oxygen-containing gas;
   a reformer for reforming a mixed gas of water vapor and a raw fuel containing hydrocarbon to produce the fuel gas supplied to the fuel cell stack;
   an evaporator for evaporating water, and supplying the water vapor to the reformer;
   a heat exchanger for raising a temperature of the oxygen-containing gas by heat exchange with a combustion gas, and supplying the oxygen-containing gas to the fuel cell stack;
   an exhaust gas combustor for combusting the fuel gas discharged from the fuel cell stack as a fuel exhaust gas and the oxygen-containing gas discharged from the fuel cell stack as an oxygen-containing exhaust gas to produce the combustion gas; and
   a start-up combustor for combusting the raw fuel and the oxygen-containing gas to produce the combustion gas,
   wherein the fuel cell module includes:
   a first area where the exhaust gas combustor and the start-up combustor are provided;
   an annular second area around the first area where one of the reformer and the heat exchanger is provided;
   an annular third area around the second area where another of the reformer and the heat exchanger is provided; and
   an annular fourth area around the third area where the evaporator is provided;
   and wherein the heat exchanger includes an annular oxygen-containing gas supply chamber to which the oxygen-containing gas is supplied, an annular oxygen-containing gas discharge chamber to which the heated oxygen-containing gas is discharged, a plurality of heat exchange pipes connected to the oxygen-containing gas supply chamber at one end, and connected to the oxygen-containing gas discharge chamber at another end, and a combustion gas channel for supplying the combustion gas to a space between the heat exchange pipes; and
   a circumscribed non-uniform flow suppression plate is provided that closes part of an inlet of the combustion gas channel by covering an outer surface of the heat exchange pipes along a minimum circumscribed circle which contacts outer surfaces of the heat exchange pipes, and that suppresses non-uniform flow of the combustion gas by changing a flow direction of the combustion gas moving inward in a radial direction within the second area and hitting an outer side surface to a direction in which the heat exchange pipes extend.

2. The fuel cell module according to claim 1, wherein the reformer includes an annular mixed gas supply chamber to which the mixed gas is supplied, an annular reformed gas discharge chamber to which the produced fuel gas is discharged, a plurality of reforming pipes connected to the mixed gas supply chamber at one end, and connected to the reformed gas discharge chamber at another end, and a combustion gas channel for supplying the combustion gas to a space between the reforming pipes; and a circumscribed non-uniform flow suppression plate is provided that closes part of an inlet of the combustion gas channel by covering an outer surface of the reforming pipes along a minimum circumscribed circle which contacts outer surfaces of the reforming pipes, and that suppresses non-uniform flow of the combustion gas by changing a flow direction of the combustion gas moving inward in a radial direction within the third area and hitting an outer side surface to a direction in which the reforming pipes extend.

3. The fuel cell module according to claim 1, wherein the evaporator includes an annular water supply chamber to which the water is supplied, an annular water vapor discharge chamber to which the water vapor is discharged, a plurality of evaporation pipes connected to the water supply chamber at one end, and connected to the water vapor discharge chamber at another end, and a combustion gas channel for supplying the combustion gas to a space between the evaporation pipes; and a circumscribed non-uniform flow suppression plate is provided that closes part of an inlet of the combustion gas channel by covering an outer surface of the evaporation pipes along a minimum circumscribed circle which contacts outer surfaces of the evaporation pipes, and that suppresses non-uniform flow of the combustion gas by changing a flow direction of the combustion gas moving inward in a radial direction within the fourth area and hitting an outer side surface to a direction in which the evaporation pipes extend.

4. The fuel cell module according to claim 1, wherein an inscribed non-uniform flow suppression plate is provided that closes part of an inlet of the combustion gas channel by covering an outer surface of the pipes along a maximum inscribed circle which contacts the outer surfaces, and that suppresses non-uniform flow of the combustion gas by changing a flow direction of the combustion gas moving inward in a radial direction within the area and hitting an outer side surface to a direction in which the pipes extend.

5. The fuel cell module according to claim 4, wherein ends of the circumscribed non-uniform flow suppression plate and the inscribed non-uniform flow suppression plate are offset from each other in a pipe length direction; and the combustion gas flows between the circumscribed non-uniform flow suppression plate and the inscribed non-uniform flow suppression plate in the pipe length direction.

6. The fuel cell module according to claim 4, further comprising a first partition plate provided between the first area and the second area, a second partition plate provided between the second area and the third area, and a third partition plate provided between the third area and the fourth area, wherein the first partition plate has a first combustion gas hole for allowing the combustion gas to flow through the first area and the second area, the second partition plate has a second combustion gas hole for allowing the combustion gas to flow through the second area and the third area, and the third partition plate has a third combustion gas hole for allowing the combustion gas to flow through the third area and the fourth area.

7. The fuel cell module according to claim 6, wherein an end of the inscribed non-uniform flow suppression plate is positioned to face at least any of the first combustion gas hole, the second combustion gas hole, and the third combustion gas hole.

8. The fuel cell module according to claim 4, wherein a cross sectional area, along a plane perpendicular to the axial direction of the pipes, of a combustion gas flow opening formed by the circumscribed non-uniform flow suppression plate, the inscribed non-uniform flow suppression plate, and outer surfaces of pipes is same as a cross sectional area of the pipes.

9. The fuel cell module according to claim 1, wherein the fuel cell module is a solid oxide fuel cell module.

\* \* \* \* \*